United States Patent
Ito et al.

(10) Patent No.: US 8,372,471 B2
(45) Date of Patent: Feb. 12, 2013

(54) ELECTRO-OPTICAL DEVICE AND ELECTRONIC INSTRUMENT

(75) Inventors: Takeshi Ito, Nagano (JP); Kazumi Aruga, Fujimi-machi (JP); Satoru Katagami, Nagano (JP); Sadaharu Komori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 674 days.

(21) Appl. No.: 12/542,985

(22) Filed: Aug. 18, 2009

(65) Prior Publication Data

US 2010/0053266 A1    Mar. 4, 2010

(30) Foreign Application Priority Data

Aug. 26, 2008  (JP) ................................. 2008-216281

(51) Int. Cl.
*B05D 5/12* (2006.01)
*B41J 2/15* (2006.01)
*B41J 2/145* (2006.01)

(52) U.S. Cl. .......................................... 427/58; 347/40
(58) Field of Classification Search .................. None
See application file for complete search history.

(56) References Cited

U.S. PATENT DOCUMENTS

| 7,898,623 | B2 | 3/2011 | Kimura et al. |
| 8,154,678 | B2 | 4/2012 | Kimura et al. |
| 2006/0290764 | A1* | 12/2006 | Nagae et al. .................. 347/107 |
| 2012/0194412 | A1 | 8/2012 | Kimura et al. |

FOREIGN PATENT DOCUMENTS

| JP | 2001-143868 A | 5/2001 |
| JP | 2006-208542 A | 8/2006 |
| JP | 2006-346575 A | 12/2006 |
| JP | 2007-041578 A | 2/2007 |
| JP | 2007-248821 A | 9/2007 |

* cited by examiner

*Primary Examiner* — Matthew Luu
*Assistant Examiner* — Renee I Wilson
(74) *Attorney, Agent, or Firm* — Global IP Counselors, LLP

(57) ABSTRACT

An electro-optical device includes a substrate having a plurality of film-formation regions configured and arranged to receive a liquid material discharged from a plurality of nozzles of a nozzle row while the substrate and the nozzle row are moved relative to each other in a primary scanning direction. Each of the film-formation regions includes a plurality of landing positions in which the liquid material lands with the landing positions being set by a nozzle interval in a direction of the nozzle row and a discharge interval in the primary scanning direction. At least two or more of the film-formation regions include a portion in which a total number of the landing positions in the at least two or more of the film-formation regions that simultaneously face the nozzles is the same in the primary scanning direction.

10 Claims, 17 Drawing Sheets

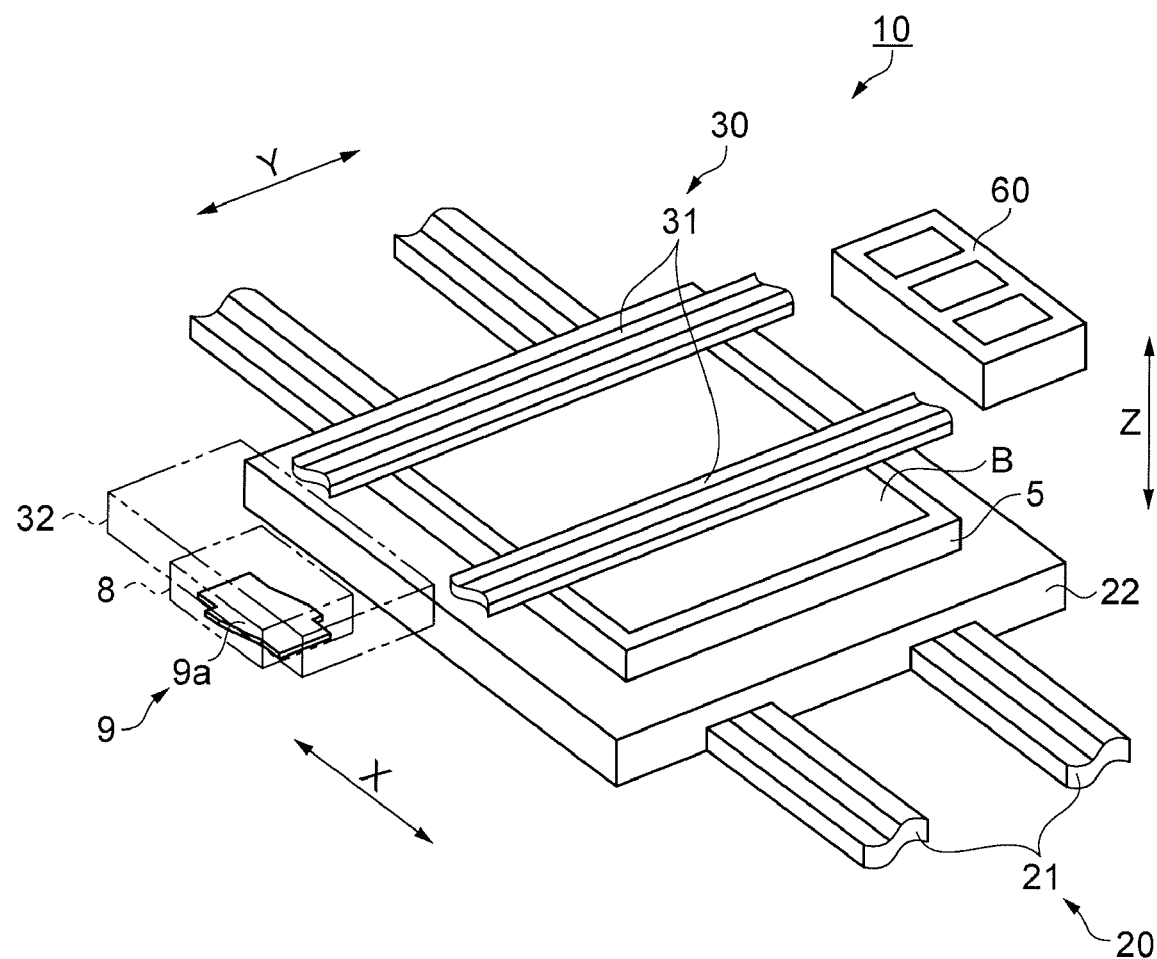
F I G. 1

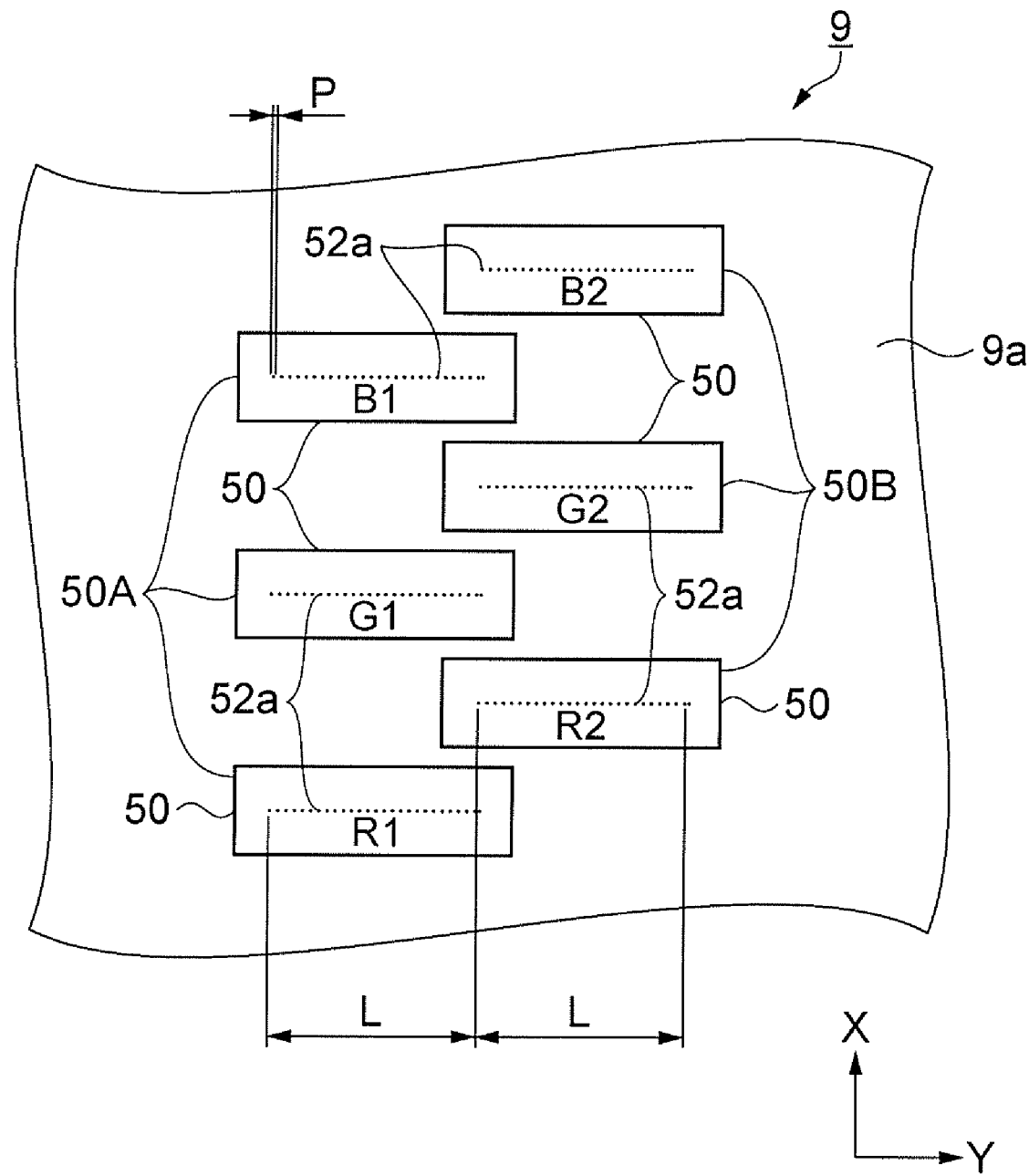
F I G. 3

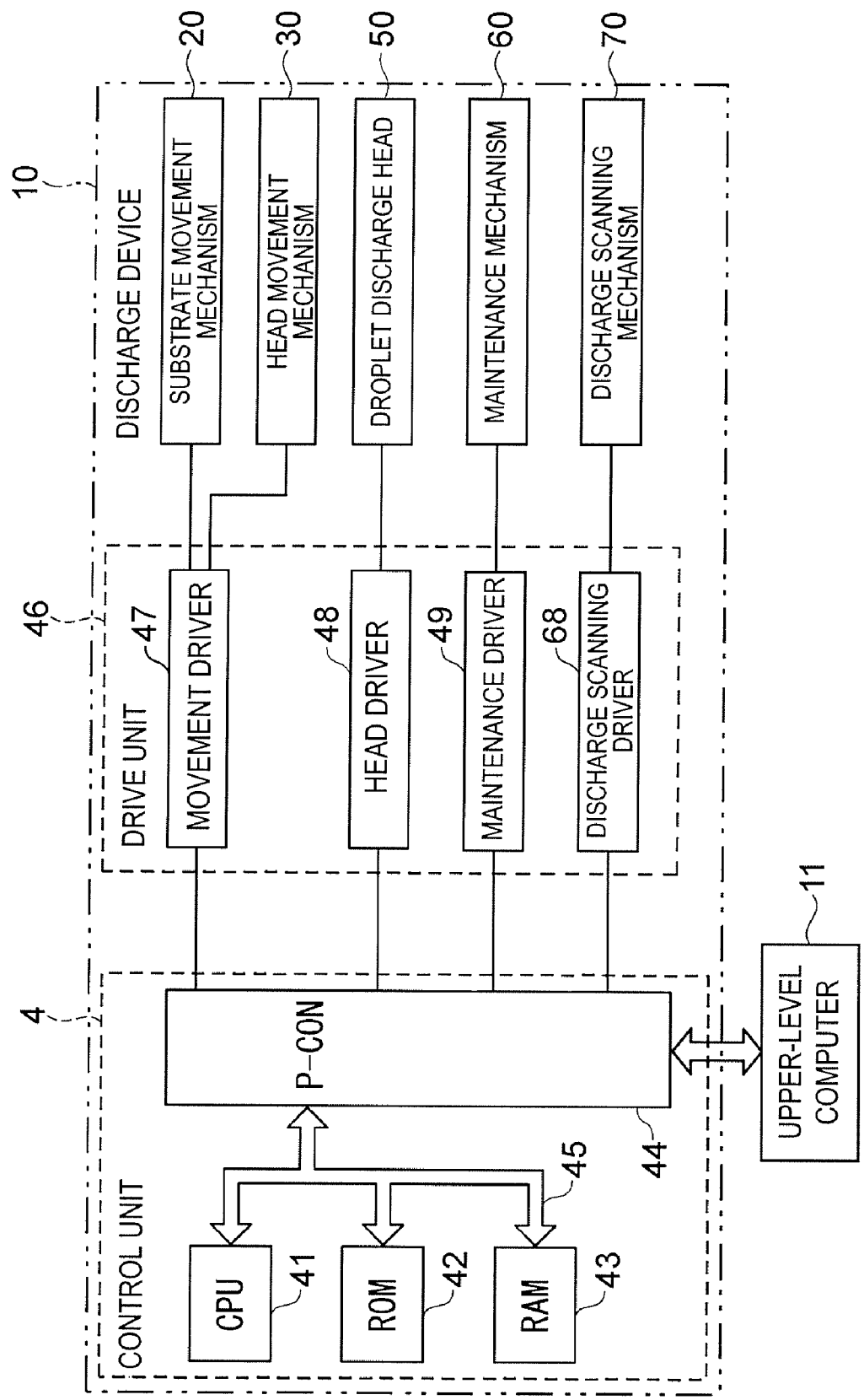
F I G. 4

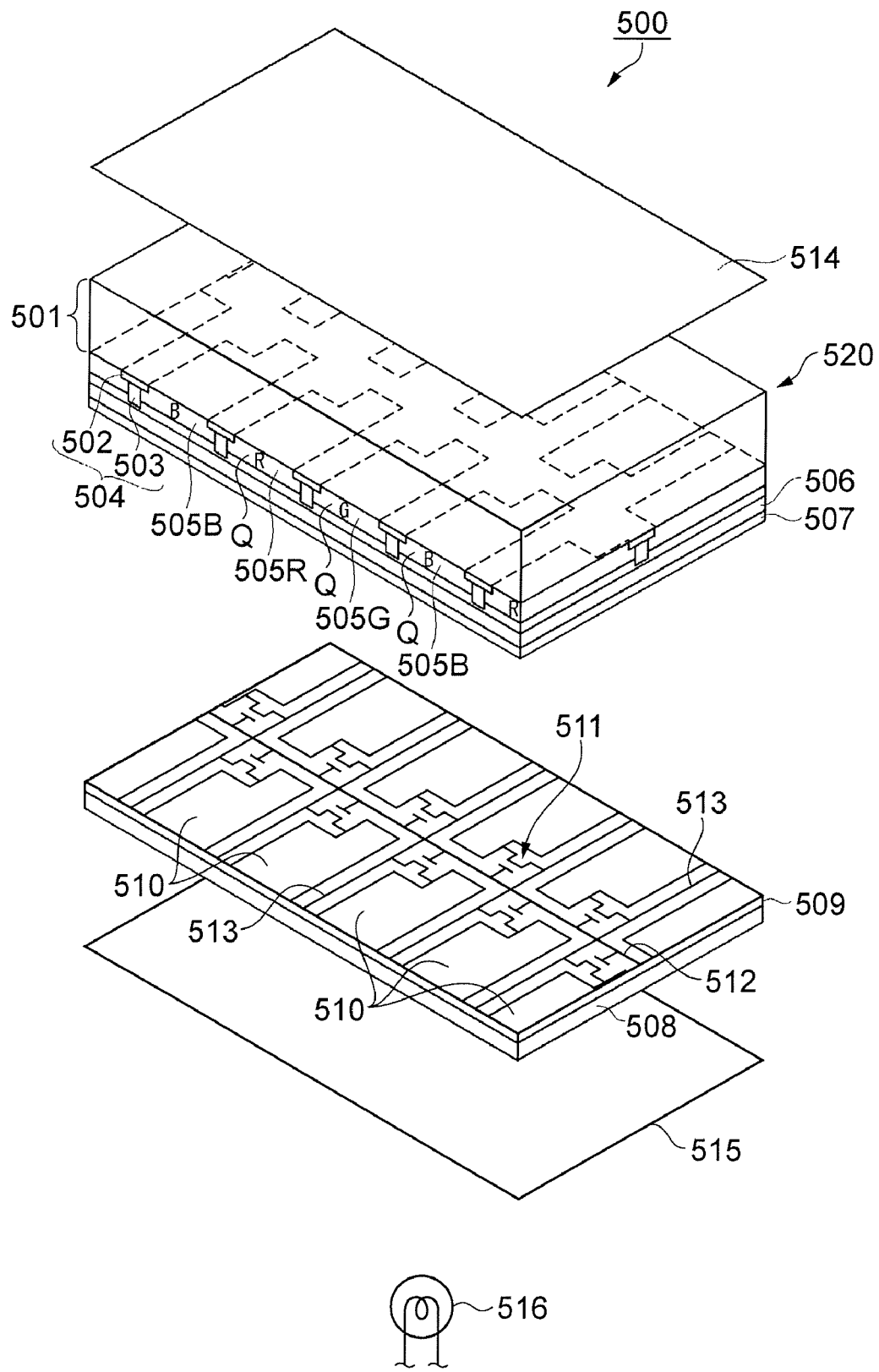
F I G. 5

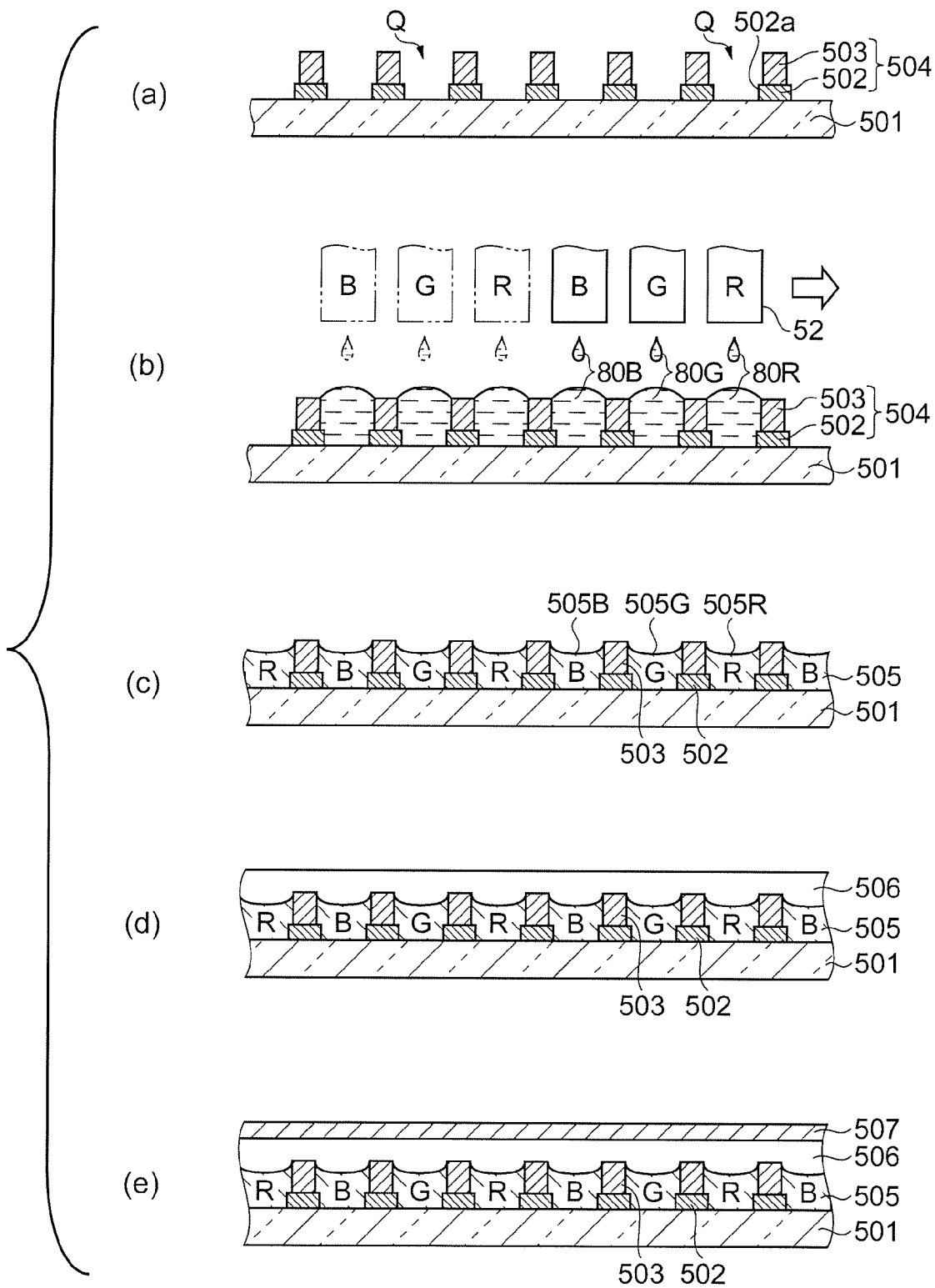
F I G. 8

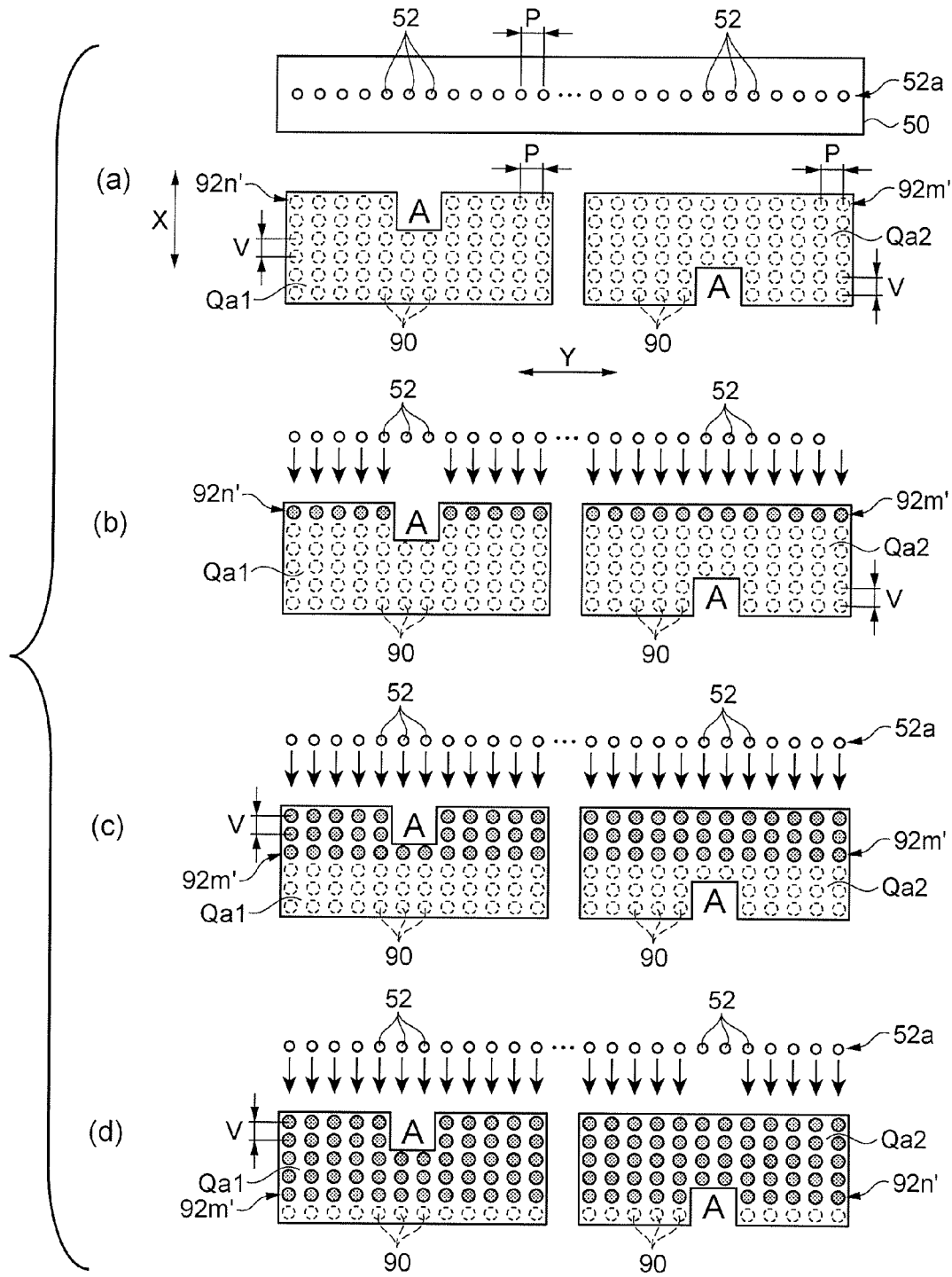
F I G. 10

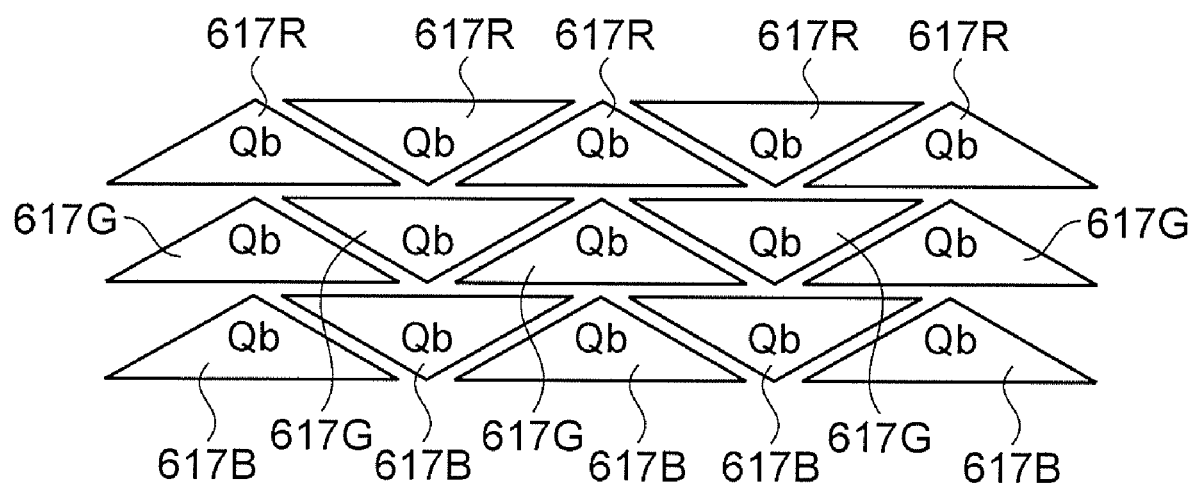
F I G. 12

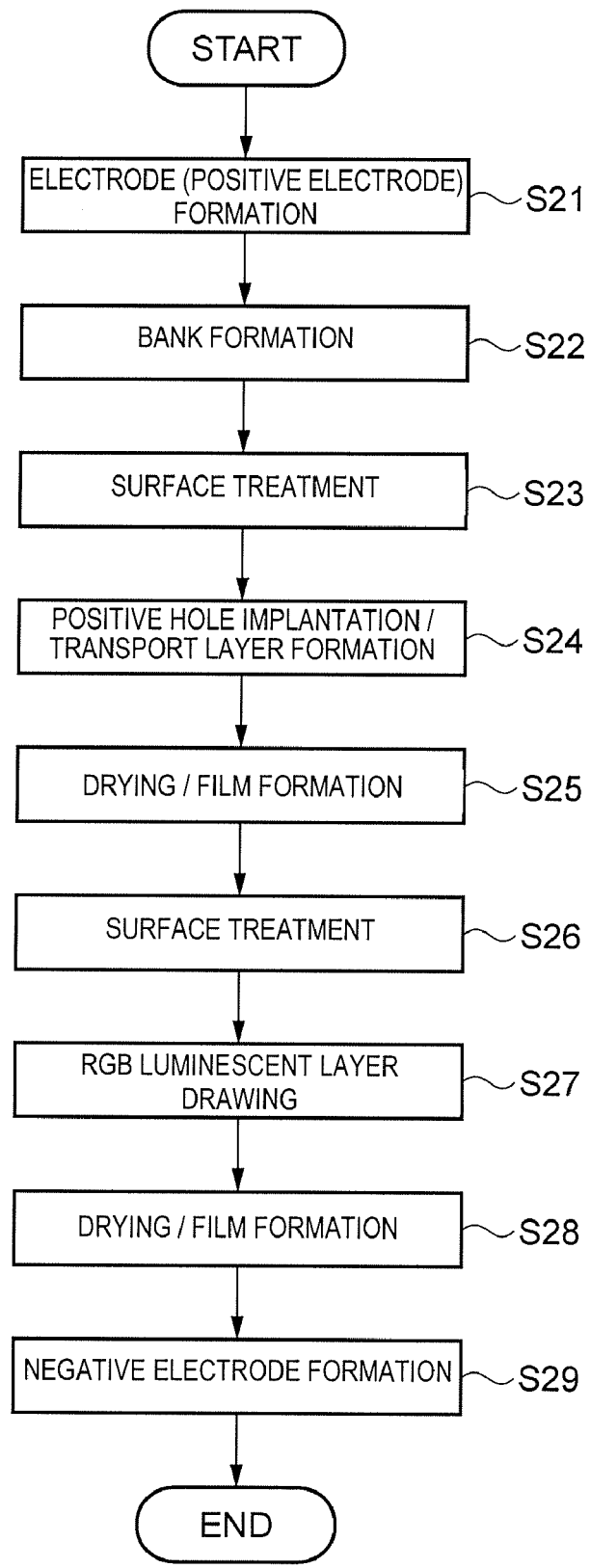
F I G. 13

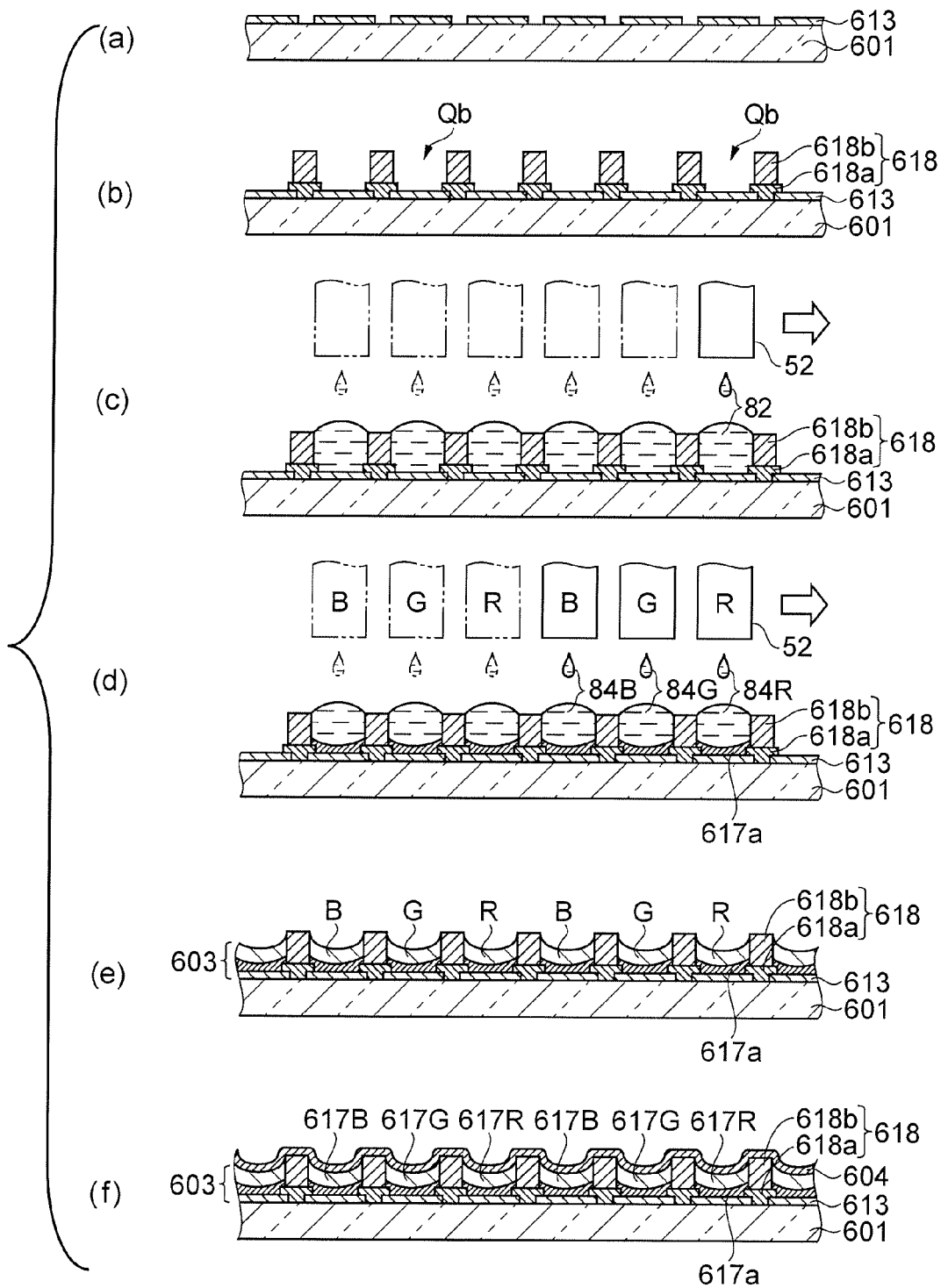
F I G. 14

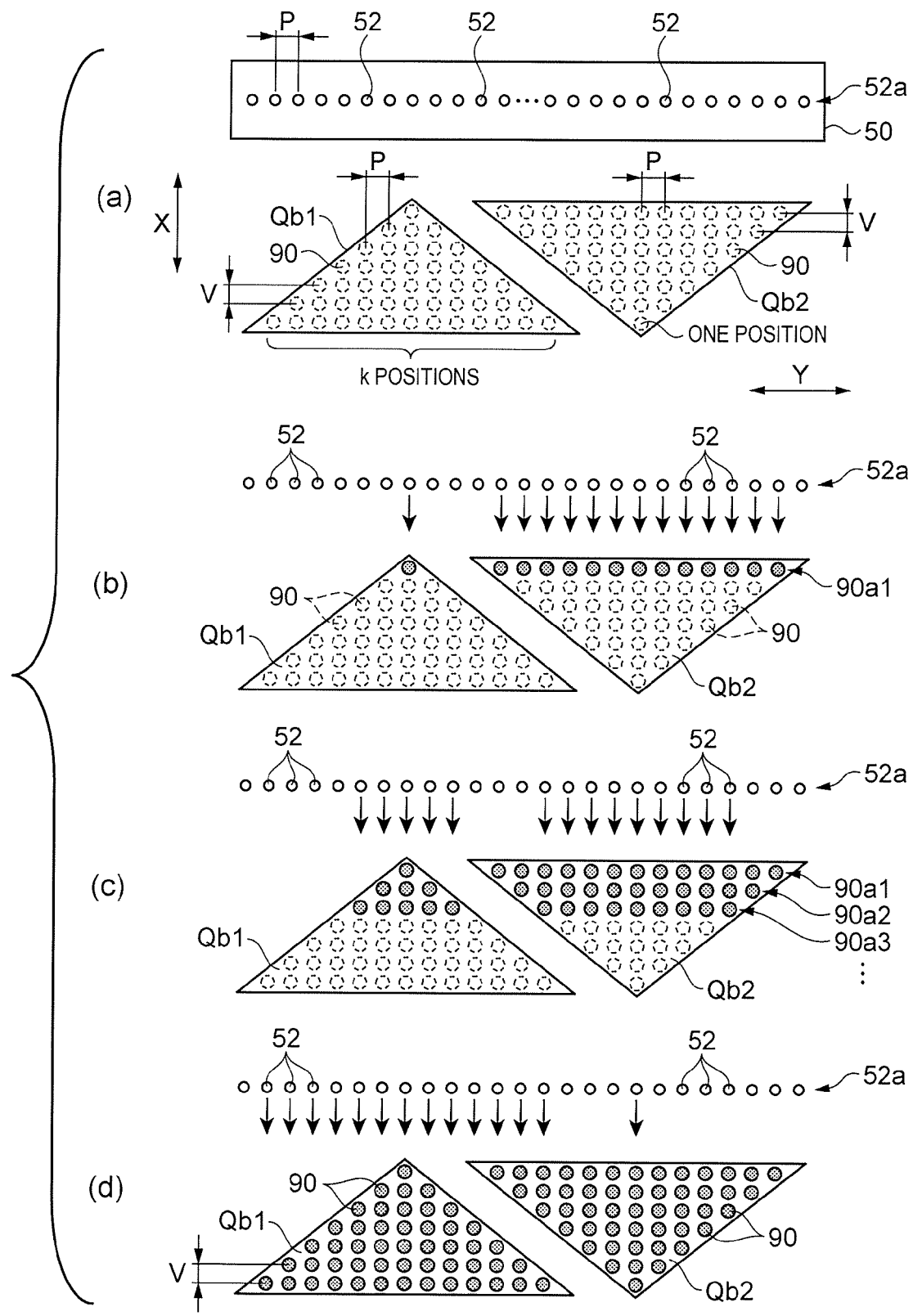
F I G. 15

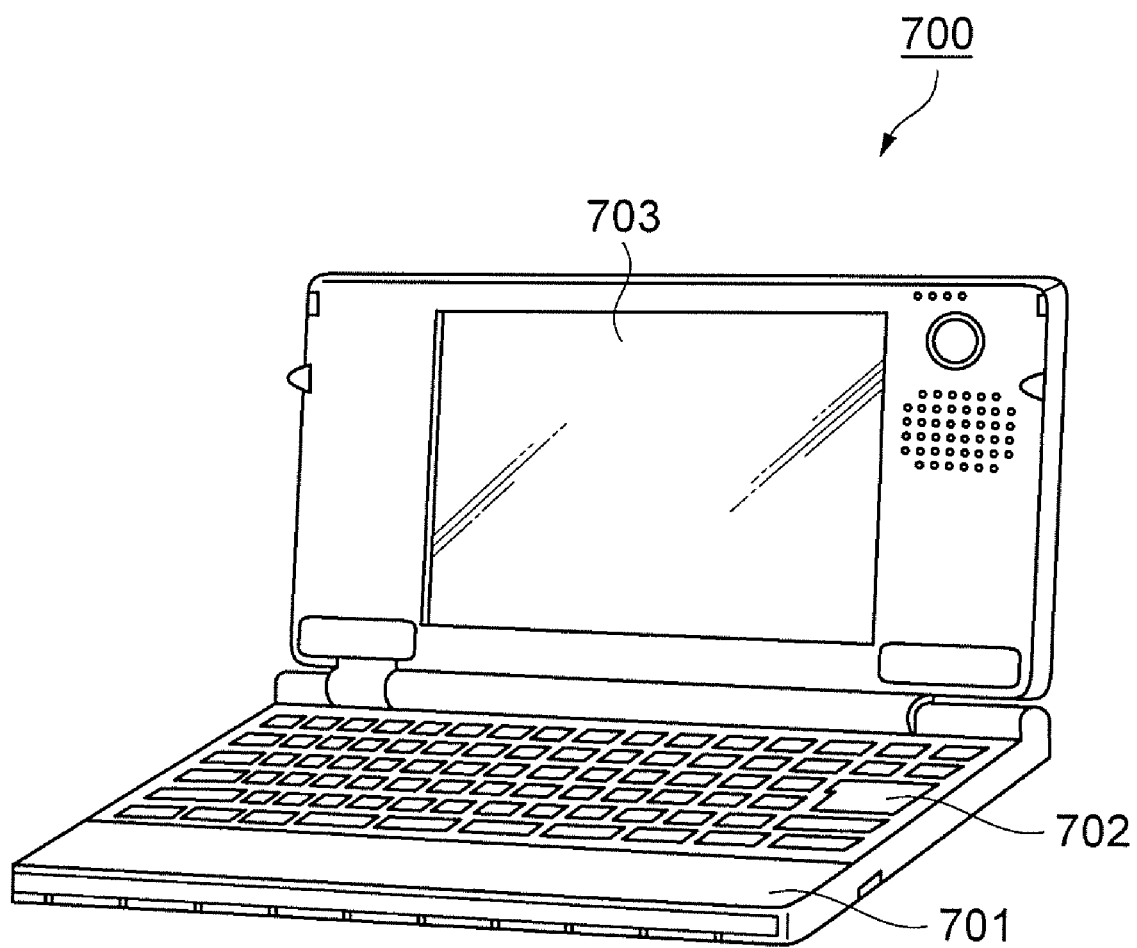
F I G. 16

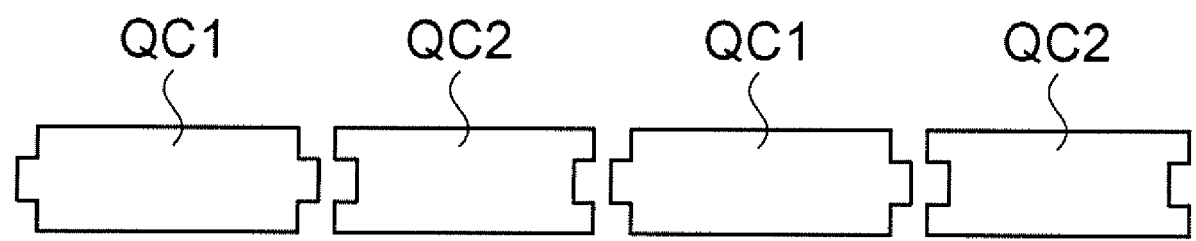
F I G. 17

ELECTRO-OPTICAL DEVICE AND ELECTRONIC INSTRUMENT

CROSS-REFERENCE TO RELATED APPLICATIONS

This application claims priority to Japanese Patent Application No. 2008-216281 filed on Aug. 26, 2008. The entire disclosure of Japanese Patent Application No. 2008-216281 is hereby incorporated herein by reference.

BACKGROUND

1. Technical Field

The present invention relates to an electro-optical device in which numerous pixels are formed, and to an electronic instrument that is provided with the electro-optical device.

2. Related Art

Liquid crystal display devices, organic EL (electroluminescence) devices, and other electro-optical devices are included as display devices used in mobile telephones, personal computers, PDAs (personal digital assistants), and other electronic instruments. The color filters of liquid crystal display devices, the luminescent layers of organic EL devices, and other thin films are known to be formed by a droplet discharge method (inkjet scheme) in the manufacture of these electro-optical devices (see Japanese Laid-Open Patent Publication No. 2006-346575, for example).

Minute amounts of a liquid material can be applied in the desired positions according to the resolution of the droplet discharge head used in a thin-film formation technique that uses a droplet discharge method. It is therefore possible to form patterns that are vastly finer than patterns formed by relief printing or another printing technique. In a case in which red, green, and blue color filter layers are formed on a substrate, for example, a liquid material that includes red, green, or blue color material is discharged from the nozzles of a droplet discharge head into regions (pixels) that are partitioned on a substrate, and the liquid material is dried and hardened to form a color filter layer. In order to increase the open area of a pixel, there has recently been proposed a color filter that has a notched part for placement of a TFT or other switching element or the like for applying voltage to the pixel electrode in the pixel (see Japanese Laid-Open Patent Publication No. 10-78590, for example).

In an organic EL device, a liquid material that includes a functional material is discharged onto regions (pixels) in which luminescent layers or the like are to be formed on the substrate, and the liquid material is dried and hardened to form thin film layers. The pixels have commonly been formed in rectangular shapes, but triangular or polygonal-shaped pixels have recently been proposed in order to increase resolution and eliminate wasted space in the pixel arrangement (see Japanese Laid-Open Patent Publication No. 2001-143868, for example).

SUMMARY

The quantity of the liquid material discharged (referred to as discharge quantity hereinafter) from the droplet discharge head must be uniform over the entire surface of the substrate that includes the pixels in order for the thin films to be uniformly formed by the droplet discharge method. However, in a droplet discharge head that comprises numerous nozzles, the discharge quantity of the liquid material sometimes fluctuates between nozzles. Variations in nozzle duty are one cause of fluctuation of the discharge quantity between nozzles. The term "nozzle duty" refers to the ratio of nozzles actually in use among the plurality of nozzles provided to the droplet discharge head; i.e., the nozzle usage rate (used nozzles/all nozzles). When the nozzle duty varies, structural crosstalk (differences in ink supply according to use of a shared ink reservoir, physical effects between adjacent nozzles, and other effects) occurs in the droplet discharge head, and the discharge quantity fluctuates as a result.

When a droplet discharge method is used to discharge a liquid material onto a substrate in which numerous pixels are formed in the different shapes described above, the discharge pattern; i.e., the combination of used nozzles and unused nozzles among the plurality of nozzles, varies in scanning by the droplet discharge head. The nozzle duty therefore varies, and the discharge quantity of the liquid material fluctuates. When the discharge quantity of the liquid material fluctuates, stripes of uneven shading occur in the resultant color filters or luminescent layers. Such stripes of uneven shading are readily visible, and reduce the quality of the displayed image.

The present invention was developed to overcome at least some of the problems described above, and can be implemented in the forms or aspects described below.

An electro-optical device according to a first aspect includes a substrate having a plurality of film-formation regions configured and arranged to receive a liquid material discharged from a plurality of nozzles of a nozzle row while the substrate and the nozzle row are moved relative to each other in a primary scanning direction. Each of the film-formation regions includes a plurality of landing positions in which the liquid material lands with the landing positions being set by a nozzle interval in a direction of the nozzle row and a discharge interval in the primary scanning direction. At least two or more of the film-formation regions include a portion in which a total number of the landing positions in the at least two or more of the film-formation regions that simultaneously face the nozzles is the same in the primary scanning direction.

According to this aspect, at least two or more film-formation regions can be arranged so that the total number of possible landing positions thereof in the nozzle row direction is the same in an electro-optical device that has film-formation regions in which pixels are formed. A configuration can therefore be obtained in which the same number of nozzles discharge the liquid material at the same timing. Specifically, variation of the nozzle duty can be reduced. As a result, it is possible to reduce fluctuation of the discharge quantity due to variation in nozzle duty, and it is possible to reduce the occurrence of stripes of uneven shading in the resultant color filters or luminescent layers. Consequently, it is possible to prevent reduction in quality of the image displayed by a liquid crystal display device, organic EL device, or other electro-optical device.

In the electro-optical device described above, at least one of the film-formation regions preferably includes a portion in which a number of the landing positions that simultaneously face the nozzles changes in the primary scanning direction.

In the electro-optical device described above, the film-formation regions preferably include a first region and a second region having a different shape or a different arrangement of the landing positions from the first region. The first and second regions preferably include a portion in which a number of the landing positions in the first region that simultaneously face the nozzles is different from a number of the landing positions in the second region that simultaneously face the nozzles.

According to these aspects, the pixels; i.e., the film-formation regions, may be configured so as to be triangular, polygonal, or otherwise non-rectangular in shape in the electro-optical device, and the film-formation regions may be composed of first regions and second regions that mutually differ in shape or arrangement. Such film-formation regions may also each have the same total number of possible landing positions in the nozzle row direction. A configuration can therefore be obtained in which the same number of nozzles discharge from the nozzle row at the same timing, and variation of the nozzle duty can be reduced. As a result, it is possible to reduce fluctuation of the discharge quantity due to variation in nozzle duty.

An electro-optical device according to another aspect includes a substrate having a plurality of film-formation regions configured and arranged to receive a liquid material discharged from a plurality of nozzles of a nozzle row while the substrate and the nozzle row are moved relative to each other in a primary scanning direction. Each of the film-formation regions including a plurality of landing positions in which the liquid material lands with the landing positions being set by a nozzle interval in a direction of the nozzle row and a discharge interval in the primary scanning direction. A total number of the landing positions that simultaneously face the nozzles being the same in the primary scanning direction in at least two or more of the film-formation regions that face the nozzle row.

According to this aspect, at least two or more film-formation regions can be arranged so that the total number of possible landing positions thereof in the nozzle row direction is the same in an electro-optical device that has film-formation regions in which pixels are formed. A configuration can therefore be obtained in which the same number of nozzles discharge the liquid material at the same timing. Specifically, variation of the nozzle duty can be reduced. As a result, it is possible to reduce fluctuation of the discharge quantity due to variation in nozzle duty, and it is possible to reduce the occurrence of stripes of uneven shading in the resultant color filters or luminescent layers. Consequently, it is possible to prevent reduction in quality of the image displayed by a liquid crystal display device, organic EL device, or other electro-optical device.

In the electro-optical device described above, at least one of the film-formation regions preferably includes a portion in which a number of the landing positions that simultaneously face the nozzles changes in the primary scanning direction.

In the electro-optical device described above, the film-formation regions preferably include a first region and a second region having a different shape or a different arrangement of the landing positions from the first region. The first and second regions preferably include a portion in which a number of the landing positions in the first region that simultaneously face the nozzles is different from a number of the landing positions in the second region that simultaneously face the nozzles.

According to these aspects, the pixels; i.e., the film-formation regions, may be configured so as to be triangular, polygonal, or otherwise non-rectangular in shape in the electro-optical device, and the film-formation regions may be composed of first regions and second regions that mutually differ in shape or arrangement. Such film-formation regions may also each have the same total number of possible landing positions in the nozzle row direction. A configuration can therefore be obtained in which the same number of nozzles discharge from the nozzle row at the same timing, and variation of the nozzle duty can be reduced. As a result, it is possible to reduce fluctuation of the discharge quantity due to variation in nozzle duty.

In the electro-optical device described above, a number of the landing positions in the first region and a number of the landing positions in the second region are preferably set to be equal to each other.

According to this aspect, first pixels (first regions) and second pixels (second regions) can be arranged so that the total number of possible landing positions in the nozzle row direction is the same even in an electro-optical device in which pixels of the same shape are formed in different arrangements. A configuration can therefore be obtained in which the same number of nozzles discharge the liquid material at the same timing. Specifically, variation of the nozzle duty can be reduced.

An electronic instrument according to another aspect includes the electro-optical device described above.

Through this aspect, the electronic instrument comprises the electro-optical device described above and it is thereby possible to provide an electronic instrument having high image quality, in which the occurrence of stripes of uneven shade is reduced.

BRIEF DESCRIPTION OF THE DRAWINGS

Referring now to the attached drawings which form a part of this original disclosure:

FIG. 1 is a schematic perspective view showing the structure of the liquid material discharge device;

FIG. 3 is a schematic plan view showing the arrangement of the droplet discharge heads in the head unit;

FIG. 4 is a block diagram showing the control system of the liquid material discharge device;

FIG. 5 is a schematic perspective view showing the structure of the liquid crystal display device;

FIG. 8 is a schematic sectional view showing the method for manufacturing the liquid crystal display device;

FIG. 10 is a view showing the positional relationship between the droplet discharge heads and the film-formation regions in the second embodiment;

FIG. 12 is a view showing an example of the pixel shape and pixel arrangement of the organic EL device in the third embodiment;

FIG. 13 is a flowchart showing the method for manufacturing the organic EL device;

FIG. 14 is a schematic sectional view showing the method for manufacturing the organic EL device;

FIG. 15 is a view showing the positional relationship between the droplet discharge head and the film-formation regions in the third embodiment;

FIG. 16 is a perspective view showing a mobile information processing device as the electronic instrument in the fourth embodiment; and FIG. 17 is a view showing a modification.

DETAILED DESCRIPTION OF EXEMPLARY EMBODIMENTS

Figure 2:
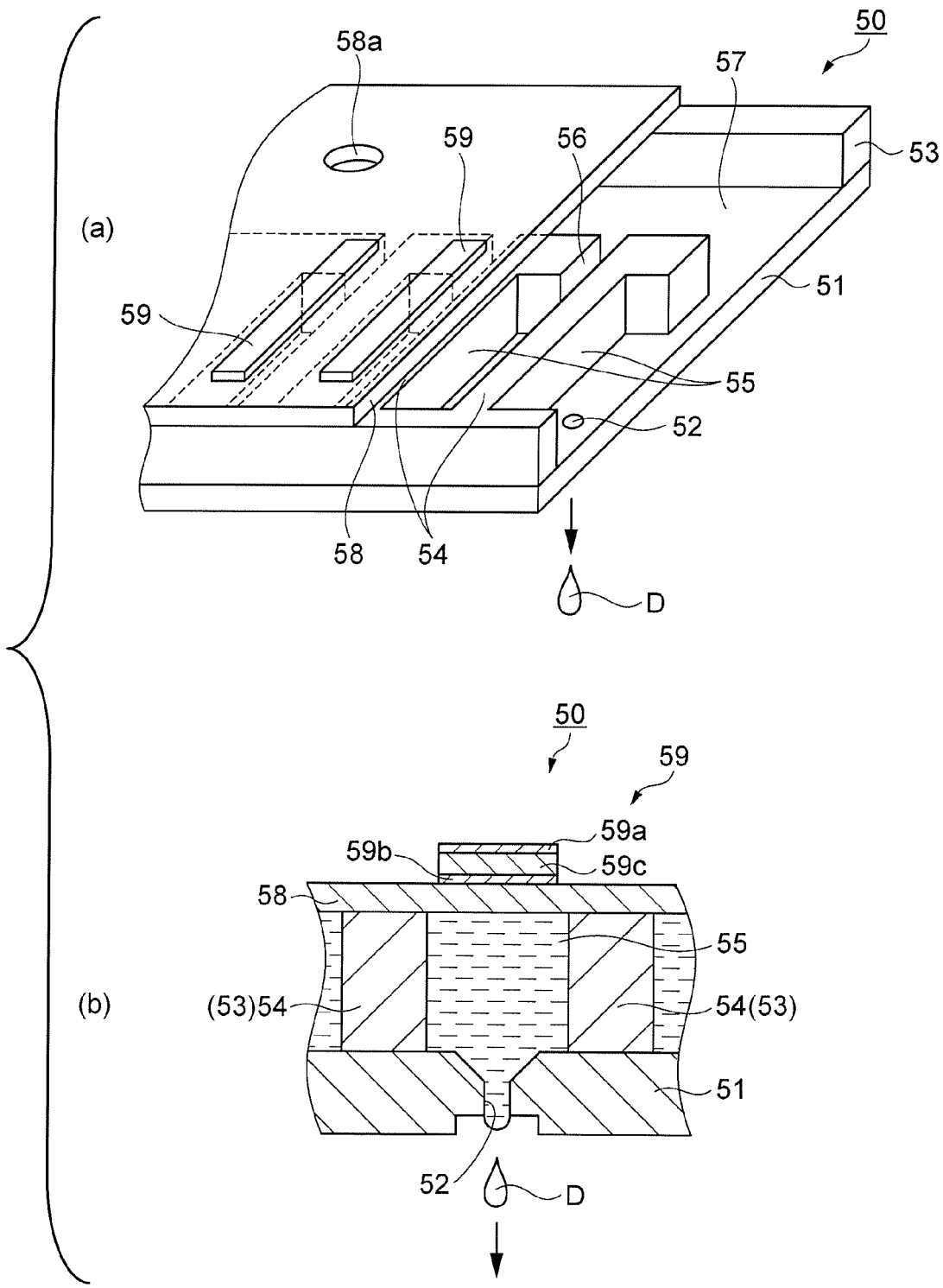
FIG. 2 is a schematic view showing the structure of a droplet discharge head.

The present invention will be described using as an example a color filter having a plurality of colors of color layers in a plurality of pixels as film-formation regions partitioned on a substrate. The color layers are elements that constitute pixels, and are formed by discharging droplets of a liquid material that includes a color layer formation material from a plurality of nozzles to the film-formation regions. The liquid material discharge device described hereinafter is used to discharge the liquid material in the form of droplets.

Structure of Liquid Material Discharge Device

The liquid material discharge device provided with a droplet discharge head for discharging the liquid material will first be described with reference to FIG. 1. FIG. 1 is a schematic perspective view showing the structure of the liquid material discharge device.

As shown in FIG. 1, the liquid material discharge device 10 is provided with a substrate movement mechanism 20 for moving a substrate B in the primary scanning direction, the substrate B being an object to be discharged onto; and a head movement mechanism 30 for moving a head unit 9 having a plurality of droplet discharge heads in a secondary scanning direction. The liquid material discharge device 10 discharges droplets of a liquid material from the plurality of droplet discharge heads mounted in the head unit 9 while varying the position of the substrate B and the head unit 9 relative to each other, and forms a predetermined functional film of the liquid material on the substrate B. The X direction in the drawing is the movement direction of the substrate B, i.e., the primary scanning direction, the Y direction is the movement direction of the head unit 9, i.e., the secondary scanning direction, and the Z direction is the direction orthogonal to the X direction and the Y direction.

In a case in which such a liquid material discharge device 10 is used to manufacture a color filter having red, green, and blue filter elements, for example, droplets of a liquid material of any of the three colors red, green, and blue are discharged from the droplet discharge heads of the liquid material discharge device 10 to the film-formation regions of the substrate B, and red, green, and blue filter elements are formed.

The structural elements of the liquid material discharge device 10 will be described.

The substrate movement mechanism 20 is provided with a pair of guide rails 21, a movement table 22 that moves along the pair of guide rails 21, and a stage 5 for mounting the substrate B on the movement table 22 so that the substrate B can be suction-fixed in place. The movement table 22 is moved in the X direction (primary scanning direction) through the use of an air slider and a linear motor (not shown) provided inside the guide rails 21.

The head movement mechanism 30 is provided with a pair of guide rails 31, and a first movement stage 32 that moves along the pair of guide rails 31. The first movement stage 32 is provided with a carriage 8, and a head unit 9 in which a plurality of droplet discharge heads 50 (see FIG. 2) is mounted is attached to the carriage 8. The first movement stage 32 moves the carriage 8 in the Y direction (secondary scanning direction) so that the head unit 9 is positioned facing the substrate B at a predetermined distance in the Z direction from the substrate B.

Besides the components described above, the liquid material discharge device 10 is also provided with a maintenance mechanism 60 for eliminating obstructions in the nozzles of the plurality of droplet discharge heads 50 mounted in the head unit 9, and performing other maintenance. The liquid material discharge device 10 is also provided with a liquid material feeding mechanism for feeding the liquid material to the droplet discharge heads 50; and a discharge quantity measuring mechanism having an electronic scale or other measuring instrument for receiving the liquid material discharged by the droplet discharge heads 50 or by each nozzle and measuring the discharged weight of the liquid material. These mechanisms are controlled by a control unit 4 (see FIG. 4). In FIG. 1, the control unit 4, the liquid material feeding mechanism, and the discharge quantity measuring mechanism are not shown.

Droplet Discharge Heads

The droplet discharge heads having a plurality of nozzles will next be described with reference to FIGS. 2 and 3. FIG. 2 is a schematic view showing the structure of a droplet discharge head, wherein FIG. 2A is a schematic exploded perspective view, and FIG. 2B is a sectional view showing the structure of a nozzle part. FIG. 3 is a schematic plan view showing the arrangement of the droplet discharge heads in the head unit. Specifically, FIG. 3 shows a view from the side that corresponds to the substrate B. The X direction and Y direction in FIG. 3 are the same as the X direction and Y direction shown in FIG. 1.

As shown in FIGS. 2A and 2B, the droplet discharge heads 50 have a structure in which a nozzle plate 51 having a plurality of nozzles 52 from which droplets D are discharged; a cavity plate 53 having barriers 54 for partitioning cavities 55 with which the plurality of nozzles 52 communicates; and an oscillation plate 58 having transducers 59 as drive elements that correspond to the plurality of cavities 55 are layered in sequence and joined together.

The cavity plate 53 has the barriers 54 for partitioning the cavities 55 with which the nozzles 52 communicate, and has channels 56, 57 for charging the liquid material into the cavities 55. The channel 57 is between the nozzle plate 51 and the oscillation plate 58, and the space thus formed serves as a reservoir in which the liquid material is stored. The liquid material is fed through a conduit from the liquid material feeding mechanism and through a feeding hole 58a provided to the oscillation plate 58, and is stored in the reservoir. The liquid material is then charged into the cavities 55 through the channels 56.

As shown in FIG. 2B, the transducers 59 are piezoelectric elements composed of a piezo element 59c and a pair of electrodes 59a, 59b that sandwich the piezo element 59c. A drive waveform as a drive signal is applied to the pair of electrodes 59a, 59b from the outside, whereby the bonded oscillation plate 58 is caused to change shape. The volume of the cavities 55 divided by the barriers 54 thereby increases, and the liquid material is drawn into the cavities 55 from the reservoir. When application of the drive waveform is ended, the oscillation plate 58 returns to the original state and presses on the charged liquid material. This structure thereby enables the liquid material to be discharged as droplets D from the nozzles 52. The discharging of the liquid material can be controlled for each of the nozzles 52 by controlling the drive waveform that is applied to the piezo element 59c.

There may be variation of the ratio of the nozzles 52 actually being used at this time; i.e., the nozzle duty, among the plurality of nozzles 52 provided to the droplet discharge heads 50. In this case, the oscillation of the transducer 59 of one nozzle 59 in the droplet discharge heads 50 is transmitted through the liquid material of a shared reservoir and propagated to the liquid material of an adjacent nozzle 52, and changes the pressure of the liquid material; i.e., crosstalk occurs, and there is a risk of the discharge quantity fluctuating between nozzles 52.

As shown in FIG. 3, the abovementioned droplet discharge heads 50 are arranged in a head plate 9a of the head unit 9. A total of six droplet discharge heads 50 including a head group 50A composed of three droplet discharge heads 50, and a head group 50B also composed of three droplet discharge heads 50, is mounted in the head plate 9a. In this case, the same type of liquid material is discharged by a droplet discharge head 50 (head R1) of the head group 50A and by a droplet discharge head 50 (head R2) of the head group 50B. The same configuration applies for the heads G1 and G2, and the heads B1 and B2. Specifically, a configuration is adopted in which three different types of liquid material can be discharged.

The droplet discharge heads 50 have nozzle rows 52a in which a plurality of (180) nozzles 52 is arranged at a constant nozzle pitch P. Each one of the droplet discharge heads 50 therefore has a discharge width of length L. The head R1 and the head R2 are aligned in the primary scanning direction so that nozzle rows 52a that are adjacent as viewed from the primary scanning direction (X direction) are continuous at an interval of one nozzle pitch P in the secondary scanning direction (Y direction) orthogonal to the primary scanning direction. The head R1 and head R2 therefore have a discharge width of 2L.

An example is described in the present embodiment in which the nozzle rows 52a are in single file, but this configuration is not limiting. In the droplet discharge heads 50, a plurality of nozzle rows 52a may be arranged at a constant interval in the X direction of the drawing, and offset ½ pitch (P/2) from each other in the Y direction. The effective nozzle pitch P is thereby reduced, and droplets D can be discharged with high precision.

Control System of Liquid Material Discharge Device

The control system of the liquid material discharge device 10 will next be described with reference to FIG. 4. FIG. 4 is a block diagram showing the control system of the liquid material discharge device.

As shown in FIG. 4, the control system of the liquid material discharge device 10 is provided with a drive unit 46 that has various drivers for driving the droplet discharge heads 50, the substrate movement mechanism 20, the head movement mechanism 30, and other components; and the control unit 4 for controlling the liquid material discharge device 10 as well as the drive unit 46. The drive unit 46 is provided with a movement driver 47 for controlling the driving of the linear motors of each of the substrate movement mechanism 20 and the head movement mechanism 30; a head driver 48 for controlling discharge by the droplet discharge heads 50; a discharge scanning driver 68 for controlling a discharge scanning mechanism 70 for scanning (inspecting) the landing state or application state as the state of droplet discharge from the nozzles 52 of the droplet discharge heads 50; a maintenance driver 49 for controlling the driving of the maintenance units of a maintenance mechanism 60; and a discharge quantity measurement driver (not shown) for controlling the discharge quantity measuring mechanism.

The control unit 4 is provided with a CPU 41, ROM 42, RAM 43, and a P-CON 44 that are connected to each other via a bus 45. An upper-level computer 11 is connected to the P-CON 44. The ROM 42 has a control program region for storing a control program or the like processed by the CPU 41, and a control data region for storing control data and the like for performing drawing operations, function-restoring processing, and the like.

The RAM 43 has a pattern data storage unit and various other storage units for storing pattern data for drawing on the substrate B, and is used as a region for various types of operations for control processing. The various drivers and the like of the drive unit 46 are connected to the P-CON 44, and a logical circuit for assisting in the functions of the CPU 41 and handling interface signals with peripheral circuits is formed and incorporated in the P-CON 44. The P-CON 44 therefore inputs various types of commands and the like from the upper-level computer 11 to the bus 45 with or without modification, and outputs the data or control signal outputted from the CPU 41 and other components to the bus 45 to the drive unit 46 with or without modification in conjunction with the CPU 41.

The CPU 41 controls the droplet discharge device 10 as a whole by inputting various types of detection signals, various types of commands, various types of data, and the like via the P-CON 44, and processing the various types of data and the like in the RAM 43, and then outputting various types of control signals to the drive unit 46 and other components via the P-CON 44 in accordance with a control program in the ROM 42. For example, the CPU 41 controls the droplet discharge heads 50, the substrate movement mechanism 20, and the head movement mechanism 30, and positions the head unit 9 and the substrate B so as to face each other. The CPU 41 also causes droplets D of the liquid material to be discharged to form a pattern on the substrate B from a predetermined number of nozzles 52 of the droplet discharge heads 50 mounted in the head unit 9, in synchrony with the relative movement of the head unit 9 and the substrate B.

In this case, discharging of the liquid material in synchrony with movement of the substrate B in the X direction is referred to as primary scanning, and movement of the head unit 9 in the Y direction is referred to as secondary scanning. The droplet discharge device 10 of the present embodiment can discharge the liquid material through multiple repetitions of a combination of primary scanning and secondary scanning. Primary scanning is not limited to movement of the substrate B in one direction with respect to the droplet discharge heads 50, and the substrate B may also be moved back and forth.

The upper-level computer 11 not only transmits the control program, control data, and other control information to the liquid material discharge device 10, but can also modify these items of control information. The upper-level computer 11 can also function as an arrangement information generating unit for generating arrangement information for arranging the necessary amount of the liquid material as droplets D for each discharge region on the substrate on the basis of such information as position information of the nozzles 52. In the arrangement information, the classification according to discharging nozzles 52 and waiting nozzles 52, the discharge positions of droplets D in a discharge region (in other words, the relative positioning of the substrate B and the nozzles 52), the number of droplets D arranged (in other words, the number of discharges per nozzle 52 and the ratio of discharging nozzles 52), the ON/OFF state of the plurality of nozzles 52 in primary scanning, the discharge timing, and other information are expressed as a bit map, for example.

First Embodiment

The method for manufacturing a liquid crystal display device as an electro-optical device in which the abovementioned liquid material discharge device is used, and the liquid crystal display device manufactured using this manufacturing method will be described.

Liquid Crystal Display Device

Figure 6:
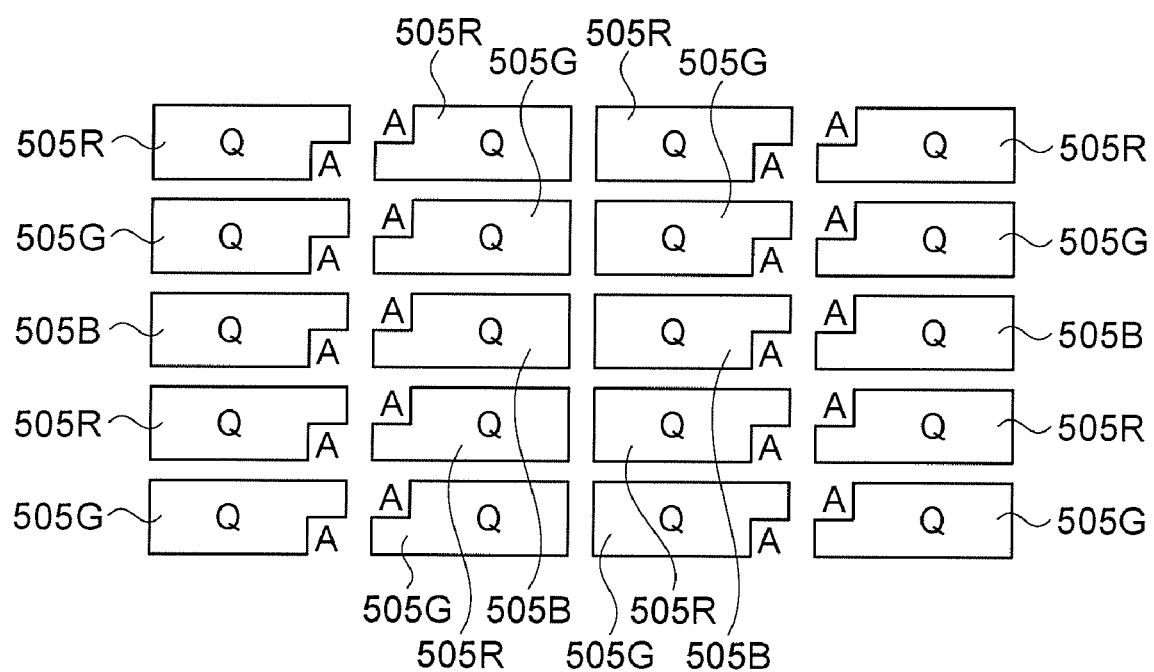
FIG. 6 is a view showing an example of the pixel shape and pixel arrangement of the color filters in the first embodiment.

The liquid crystal display device will first be described with reference to FIGS. 5 and 6. FIG. 5 is a schematic perspective view showing the structure of the liquid crystal display device, and FIG. 6 is a plan view showing an example of the pixel shape and pixel arrangement of the color filters.

As shown in FIG. 5, the liquid crystal display device 500 of the present embodiment is provided with a TFT (thin film transistor) transmissive liquid crystal display panel 520 and an illumination device 516 for illuminating the liquid crystal display panel 520. The liquid crystal display panel 520 is provided with an opposing substrate 501 as a substrate that has color filters as color elements; an element substrate 508 having TFT elements 511 in which one of three terminals is connected to a pixel electrode 510; and liquid crystals (not shown) that are held between the opposing substrate 501 and the element substrate 508. An upper polarizer 514 and a lower polarizer 515 for polarizing the transmitted light are provided to the surfaces of the opposing substrate 501 and the element substrate 508 that form the outside of the liquid crystal display panel 520.

The opposing substrate 501 is composed of transparent glass or another material, and RGB tricolor color filters 505R, 505G, 505B are formed as a plurality of types of color elements in a plurality of film-formation regions Q that is partitioned in a matrix by partition wall parts 504 on the surfaces that sandwich the liquid crystal. The partition wall parts 504 are composed of lower-layer banks 502 referred to as a black matrix that are composed of Cr or another metal or oxide film thereof that has light-blocking properties, and upper-layer banks 503 composed of an organic compound that are formed on (downward in the drawing) the lower-layer banks 502. The opposing substrate 501 is provided with an overcoat layer (OC layer) 506 as a planarizing layer for covering the color layers 505R, 505G, 505B that are partitioned by the bank 504 and the bank 504; and an opposing electrode 507 composed of ITO (indium tin oxide) or another transparent conductive film that is formed so as to cover the OC layer 506. The color filters 505R, 505G, 505B are manufactured using the method described hereinafter for manufacturing a liquid crystal display device.

The element substrate 508 is also composed of transparent glass or other material, and has pixel electrodes 510 formed in a matrix via an insulation film 509 on the side on which the liquid crystals are sandwiched; and a plurality of TFT elements 511 formed so as to correspond to the pixel electrodes 510. Of the three terminals of the TFT elements 511, the other two terminals that are not connected to the pixel electrodes 510 are connected to scanning lines 512 and data lines 513 that are arranged in a lattice so as to surround and insulate the pixel electrodes 510 from each other.

The illumination device 516 may be any illumination device that uses a white LED, EL, cold cathode tube, or the like as a light source, and that has a structure provided with a light-guide plate, a diffusion plate, a reflection plate, or the like that is capable of emitting the light from the light source to the liquid crystal display panel 520.

The liquid crystal display panel 520 is not limited to having TFT elements as the active elements, and may have TFD (thin film diode) elements, and the liquid crystal display device may be a passive-type liquid crystal display device in which the electrodes that constitute the pixels are arranged so as to intersect with each other, insofar as the liquid crystal display device is provided with color filters on at least one of the substrates. The upper and lower polarizers 514, 515 may be combined with phase difference films or other optically functional films that are used for such purposes as improving viewing angle dependency.

As shown in FIGS. 5 and 6, the color filters 505R, 505G, 505B of the present embodiment are formed in substantially rectangular shapes that have a square notched part A at one corner thereof, and the notched parts A are aligned for each color in an arrangement in which the notched parts A are on mutually different sides in pairs of adjacent pixels. The regions in which the color filters 505R, 505G, 505B are formed each correspond to a film-formation region Q. In the present embodiment, the TFT elements 511 of the element substrate 508 are provided in the positions that correspond to the notched parts A of the color filters 505R, 505G, 505B. Adopting such a formation enables the open area of the pixels to be effectively utilized, and enables the liquid material discharged to the film-formation regions Q to be effectively utilized.

Liquid Crystal Display Device Manufacturing Method

Figure 7:
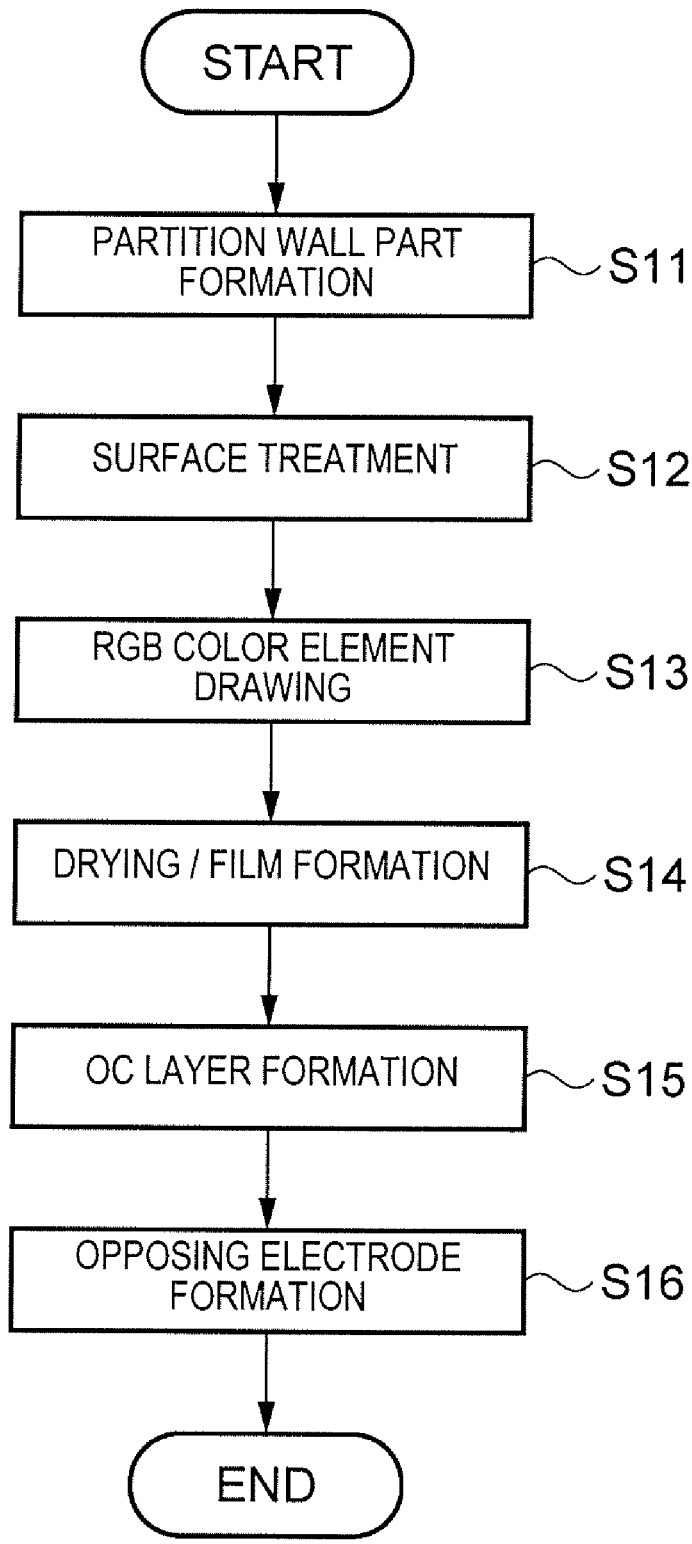
FIG. 7 is a flowchart showing the method for manufacturing the liquid crystal display device.
Figure 9:
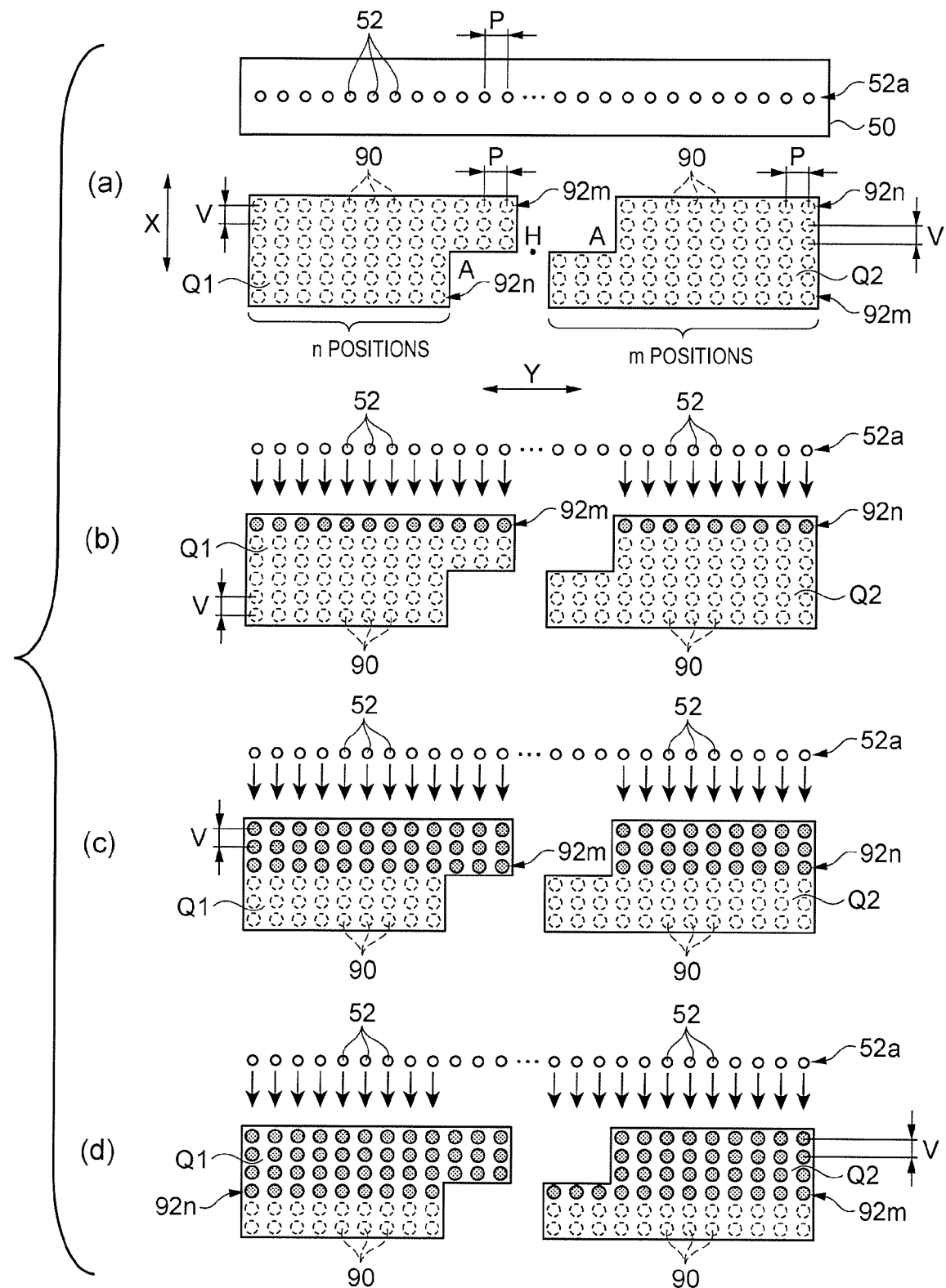
FIG. 9 is a view showing the positional relationship between the droplet discharge heads and the film-formation regions in the first embodiment.

The method for manufacturing the liquid crystal display device of the present embodiment will next be described based on FIGS. 7 through 9. FIG. 7 is a flowchart showing the method for manufacturing the liquid crystal display device. FIG. 8 is a schematic sectional view showing the method for manufacturing the liquid crystal display device. FIG. 9 is a view showing the positional relationship between the droplet discharge heads and the film-formation regions.

As shown in FIG. 7, the method for manufacturing the liquid crystal display device 500 of the present embodiment is provided with a step of forming partition wall parts 504 on the surface of the opposing substrate 501, and a step of treating the surfaces of the film-formation regions Q that are partitioned by the partition wall parts 504. The manufacturing method is also provided with a color element drawing step of discharging three types (three colors) of the liquid material that includes a color filter forming material as a color element forming material in the surface-treated film-formation regions Q using the liquid material discharge device 10 described above, and a film formation step of drying the drawn color filters 505 to form films. The manufacturing method is furthermore provided with a step of forming the OC layer 506 so as to cover the partition wall parts 504 and the color filters 505, and a step of forming the transparent opposing electrode 507 that is composed of ITO so as to cover the OC layer 506.

Step S11 in FIG. 7 is a step of forming the partition wall parts 504. In step S11, the lower-layer banks 502 as the black matrix are first formed on the opposing substrate 501, as shown in FIG. 8A. The material used to form the lower-layer banks 502 may be Cr, Ni, Al, or another non-transparent metal, or an oxide or other compound of these metals, for example. The lower-layer banks 502 are formed by a method in which a film composed of the abovementioned material is formed on the opposing substrate 501 using vapor deposition or sputtering. The film thickness may be set according to a material having an appointed film thickness that allows light-blocking properties to be maintained. For example, a thickness of 100 to 200 nm is preferred when the material is Cr. The film in areas other than the portions that correspond to the open parts 502a is covered by a resist by a photolithography method, and the film is etched using oxygen or another etching solution that corresponds to the abovementioned material. The lower-layer banks 502 having open parts 502a are thereby formed.

The upper-layer banks 503 are then formed on the lower-layer banks 502. An acrylic-based photosensitive resin material is used as the material for forming the upper-layer banks 503. The photosensitive resin material preferably has light-blocking properties. In an example of the method for forming the upper-layer banks 503, a photosensitive resin material is applied by roll coating or spin coating to the surface of the opposing substrate 501 on which the lower-layer banks 502 are formed, and the photosensitive resin material is dried to form a photosensitive resin layer having a thickness of about 2 μm. A mask provided with open parts that are sized according to the film-formation regions Q is then positioned opposite the opposing substrate 501 in a prescribed position, and exposure/development are performed to form the upper-layer banks 503. The partition wall parts 504 for partitioning the plurality of film-formation regions Q in a matrix are thereby formed on the opposing substrate 501. The process then proceeds to step S12.

Step S12 in FIG. 7 is a surface treatment step. In step S12, plasma treatment using $O_2$ as the treatment gas, and plasma treatment using a fluorine-based gas as the treatment gas are performed. Specifically, the film-formation regions Q are subjected to a lyophilizing treatment, and the surfaces of the upper-layer banks 503 (including the wall surfaces) composed of the photosensitive resin are then subjected to a fluid repellant treatment. The process then proceeds to step S13.

Step S13 in FIG. 7 is a step for drawing color filters as color elements. In step S13, liquid material 80R, 80G, 80B is supplied to draw the color filters 505 using the previously described liquid material discharge device 10 in each of the surface treated film-formation regions Q as shown in FIG. 8B. The liquid material 80R includes R (red) color filter forming material, the liquid material 80G includes G (green) color filter forming material, and the liquid material 80B includes B (blue) color-filter-forming material.

The method for supplying the liquid material to the film-formation regions Q will now be described.

The opposing substrate 501 as the substrate B is mounted on the stage 5 of the liquid material discharge device 10 shown in FIG. 1. The opposing substrate 501 is thereby positioned facing the droplet discharge heads 50 that are mounted in the head unit 9. In the present embodiment, one pair of film-formation regions Q1, Q2 is positioned opposite the nozzles 52 of one droplet discharge head 50, as shown in FIG. 9A.

Possible landing positions 90 in which the liquid material lands are set in the film-formation regions Q1, Q2. The possible landing positions 90 are determined by the nozzle interval in the secondary scanning direction (Y direction) and the discharge interval of the liquid material in the primary scanning direction (X direction). The nozzle interval in the secondary scanning direction (Y direction) is determined by the scanning direction and the pitch P of the nozzles formed in the droplet discharge heads 50. The discharge interval in the primary scanning direction (X direction) is determined by the speed at which the stage 5 is moved by the substrate movement mechanism 20 (primary scanning speed), the frequency of the discharge signal, and other factors. In the present embodiment, the nozzle interval in the secondary scanning direction is designated as the nozzle pitch P shown in FIG. 3, and the discharge interval in the primary scanning direction is designated as the pitch V determined by the movement speed of the stage 5 and the frequency of the discharge signal.

In the present embodiment, the film-formation regions Q1, Q2 are each formed in a substantially rectangular shape that has a square notched part A in one corner thereof, and the notched parts A are arranged in alternating configuration, i.e., so as to be symmetrical about the point H in the drawing.

Therefore, in the film-formation regions Q1, Q2, there are three possible landing position rows 92m composed of m possible landing positions 90 in the portions that are not notched, and three possible landing position rows 92n composed of n (m>n) possible landing positions 90 in the portions that are notched. Specifically, the film-formation regions Q1, Q2 include portions in which the number of possible landing positions 90 facing the plurality of nozzles 52 at the same time in the primary scanning direction varies.

In this arrangement, when the liquid material is discharged into the film-formation regions Q1, Q2 from the corresponding nozzles 52 of the droplet discharge heads 50, the liquid material lands in the first row of possible landing positions 90 in the Y direction that are arranged in a matrix, as shown in FIG. 9B. The liquid material is applied to m possible landing positions 90 in the film-formation region Q1, and the liquid material is applied to n possible landing positions 90 in the film-formation region Q2. Specifically, of the 180 nozzles 52 of the droplet discharge head 50, the liquid material is discharged from m+n nozzles, and the nozzle duty is (m+n)/180.

The liquid material is then discharged from the nozzles 52 while the opposing substrate 501 mounted on the stage 5 is moved an amount commensurate with the pitch V in the X direction by the substrate movement mechanism 20 of the liquid material discharge device 10 shown in FIG. 1. This operation is repeated twice. As a result, the liquid material can be supplied to the portion of the film-formation region Q1 that is not notched, and to the portion of the film-formation region Q2 that is notched, as shown in FIG. 9C.

The opposing substrate 501 is then further moved an amount commensurate with the pitch V in the X direction, and the liquid material is discharged into the film-formation regions Q1, Q2 from the nozzles 52. As a result, the fourth row of liquid material is landed, the liquid material is applied to n possible landing positions 90 in the film-formation region Q1, and the liquid material is applied to m possible landing positions 90 in the film-formation region Q2, as shown in FIG. 9D. Specifically, of the 180 nozzles 52 of the droplet discharge head 50, the liquid material is discharged from m+n nozzles. The nozzle duty is thus (m+n)/180. The liquid material is applied in the regions of the film-formation regions Q1, Q2 by repeating this operation twice.

As shown in FIG. 8B, the liquid material 80R, 80G, 80B applied to the film-formation regions Q spreads into the film-formation regions Q and rises due to surface tension. The process then proceeds to step S14.

Step S14 in FIG. 7 is a step of drying the drawn color filters 505 to form films. In step S14, the discharged and drawn color filters 505 are dried at once, the solvent component is removed from the liquid material 80R, 80G, 80B, and color filters 505R, 505G, 505B are formed as films, as shown in FIG. 8C. Vacuum drying or another method capable of uniformly drying the solvent component is preferred as the drying method. The process then proceeds to step S15.

Step S15 of FIG. 7 is an OC layer formation step. In step S15, the OC layer 506 is formed so as to cover the upper-layer banks 503 and the color filters 505, as shown in FIG. 8D. A transparent acrylic-based resin material may be used to form the OC layer 506. Formation methods include spin coating, offset printing, and other methods. The OC layer 506 is provided to mitigate irregularities in the surface of the opposing substrate 501 on which the color filters 505 are formed, and to flatten the opposing electrode 507 that is subsequently formed as a film on the surface of the opposing substrate 501.

A thin film of SiO₂ or the like may also be formed on the OC layer 506 to maintain adhesion to the opposing electrode 507. The process then proceeds to step S16.

Step S16 in FIG. 7 is a step of forming the opposing electrode 507. In step S16, a film of ITO or another transparent electrode material is formed in a vacuum using sputtering or vapor deposition, and the opposing electrode 507 is formed on the entire surface so as to cover the OC layer 506, as shown in FIG. 8E.

Assembly of the liquid crystal display device 500 is then completed by using an adhesive to adhere the opposing substrate 501 and the element substrate 508 that has the pixel electrodes 510 and the TFT elements 511 formed as described above in a predetermined position, and charging liquid crystals into the space between the substrates 501, 508.

The effects of the first embodiment are described below.

(1) In the liquid crystal display device 500, the total number of possible landing positions 90 in the direction of the nozzle rows 52a of the droplet discharge head 50 can be set to m+n in the film-formation regions Q1, Q2 of the color filters 505R, 505G, 505B. The number of nozzles 52 that discharge the liquid material at the same time can therefore be set to m+n. Specifically, the nozzle duty is always stabilized at (m+n)/180, and it is possible to minimize fluctuation of the discharge quantity due to variation in the nozzle duty. The occurrence of stripes of uneven shading in the color filters 505R, 505G, 505B can thus be reduced, and the image quality of the liquid crystal display device 500 as an electro-optical device can be enhanced.

Second Embodiment

A second embodiment will be described with reference to FIG. 10. FIG. 10 is a view showing the positional relationship between the droplet discharge heads and the film-formation regions in the second embodiment. The same reference symbols are used to indicate components and details that are the same as those of the first embodiment, and no further description thereof will be given.

As shown in FIG. 10A, the film-formation regions Qa1, Qa2 of the second embodiment have a substantially rectangular shape and are formed so as to have a square notch substantially at the center of the upper or lower long edges thereof, and the notched parts A in a pair of two adjacent film-formation regions Qa1, Qa2 are positioned so that one notched part A is at the top edge and the other notched part A is at the bottom edge. The TFT elements 511 (see FIG. 5) of the element substrate 508 are provided in the positions that correspond to the notched parts A.

The method for supplying the liquid material to the film-formation regions Qa1, Qa2 will be described. The opposing substrate 501 as the substrate B is mounted on the stage 5 of the liquid material discharge device 10 shown in FIG. 1. The opposing substrate 501 is thereby positioned facing the droplet discharge heads 50 that are mounted in the head unit 9. In the present embodiment, one pair of film-formation regions Qa1, Qa2 is positioned opposite the nozzles 52 of one droplet discharge head 50, as shown in FIG. 10A.

Possible landing positions 90 in which the liquid material lands are set in the film-formation regions Qa1, Qa2. The possible landing positions 90 of the liquid material are determined by the nozzle interval in the secondary scanning direction (Y direction) and the discharge interval of the liquid material in the primary scanning direction (X direction). The nozzle interval in the secondary scanning direction (Y direction) is determined by the scanning direction and the pitch P of the nozzles formed in the droplet discharge heads 50. The discharge interval in the primary scanning direction (X direction) is determined by the speed at which the stage 5 is moved by the substrate movement mechanism 20 (primary scanning speed), the frequency of the discharge signal, and other factors. In the present embodiment, the nozzle interval in the secondary scanning direction is designated as the nozzle pitch P shown in FIG. 3, and the discharge interval in the primary scanning direction is designated as the pitch V determined by the movement speed of the stage 5 and the frequency of the discharge signal.

In the film-formation regions Qa1, Qa2 in the present embodiment, there are four possible landing position rows 92m' composed of m' possible landing positions 90 in the portions that are not notched, and two possible landing position rows 92n' composed of n' (m'>n') possible landing positions 90 in the portions that are notched, for example. Specifically, the film-formation regions Qa1, Qa2 include portions in which the number of possible landing positions 90 facing the plurality of nozzles 52 at the same time in the primary scanning direction varies.

In this arrangement, when the liquid material is discharged into the film-formation regions Qa1, Qa2 from the corresponding nozzles 52 of the droplet discharge heads 50, the liquid material lands in the first row of possible landing positions 90 in the Y direction that are arranged in a matrix, as shown in FIG. 10B. At this time, the liquid material is applied to n' possible landing positions 90 in the film-formation region Qa1, and the liquid material is applied to m' possible landing positions 90 in the film-formation region Qa2. Specifically, of the 180 nozzles 52 of the droplet discharge head 50, the liquid material is discharged from m'+n' nozzles, and the nozzle duty is (m'+n')/180.

The liquid material is then discharged from the nozzles 52 while the opposing substrate 501 mounted on the stage 5 is moved an amount commensurate with the pitch V in the X direction by the substrate movement mechanism 20 of the liquid material discharge device 10 shown in FIG. 1. As a result, the liquid material can be supplied to the portion of the film-formation region Qa1 that is notched, and to the portion of the film-formation region Qa2 that is not notched.

The opposing substrate 501 is then further moved an amount commensurate with the pitch V in the X direction, and the liquid material is discharged into the film-formation regions Qa1, Qa2 from the nozzles 52. As a result, the third row of liquid material is landed, the liquid material is applied to m' possible landing positions 90 in the film-formation region Qa1, and the liquid material is applied to m' possible landing positions 90 in the film-formation region Qa2, as shown in FIG. 10C. Specifically, of the 180 nozzles 52 of the droplet discharge head 50, the liquid material is discharged from m'+m' nozzles. The nozzle duty is thus 2m'/180. The liquid material is applied in the third and fourth rows of possible landing positions 90 of the film-formation regions Qa1, Qa2 by repeating this operation twice.

The opposing substrate 501 is then moved an amount commensurate with the pitch V in the X direction, and the liquid material is discharged into the film-formation regions Qa1, Qa2 from the nozzles 52. As a result, the fifth row of liquid material is landed, the liquid material is applied to m' possible landing positions 90 in the film-formation region Qa1, and the liquid material is applied to n' possible landing positions 90 in the film-formation region Qa2, as shown in FIG. 10D. Specifically, of the 180 nozzles 52 of the droplet discharge head 50, the liquid material is discharged from m'+n' nozzles. The nozzle duty is thus (m'+n')/180. The liquid material is applied in the fifth and sixth rows of possible landing positions 90 of the film-formation regions Qa1, Qa2 by repeating this operation. As a result, the liquid material can be applied in all the regions of the film-formation regions Qa1, Qa2.

The liquid crystal display device 500 is manufactured thereafter using the same method as that of the first embodiment.

The effects of the second embodiment are described below.

(1) In the liquid crystal display device 500, the total number of possible landing positions 90 in the direction of the nozzle rows 52a of the droplet discharge head 50 can be set to m'+n' for the notched portions in the film-formation regions Qa1, Qa2 by arranging the notched portions in alternating fashion. The number of nozzles 52 that discharge the liquid material at the same timing can therefore be set to m'+n' for the notched portions of the film-formation regions Qa1, Qa2. The number of nozzles 52 that discharge the liquid material at the same timing is 2m' for the portions that are not notched, but in comparison to a case in which the film-formation regions Qa1, Qa2 are randomly arranged, fluctuation of the nozzle duty can be reduced, and it is possible to minimize fluctuation of the discharge quantity due to variation in the nozzle duty. The occurrence of stripes of uneven shading in the color filters 505R, 505G, 505B can thus be reduced, and the image quality of the liquid crystal display device 500 as an electro-optical device can be enhanced.

Third Embodiment

There will now be described a method for manufacturing an organic EL device as an electro-optical device that uses the liquid material discharge device described above, and an organic EL device manufactured using this manufacturing method. The same reference symbols are used to indicate components and details that are the same as those of the first and second embodiments, and no further description thereof will be given.

Organic EL Device

Figure 11:
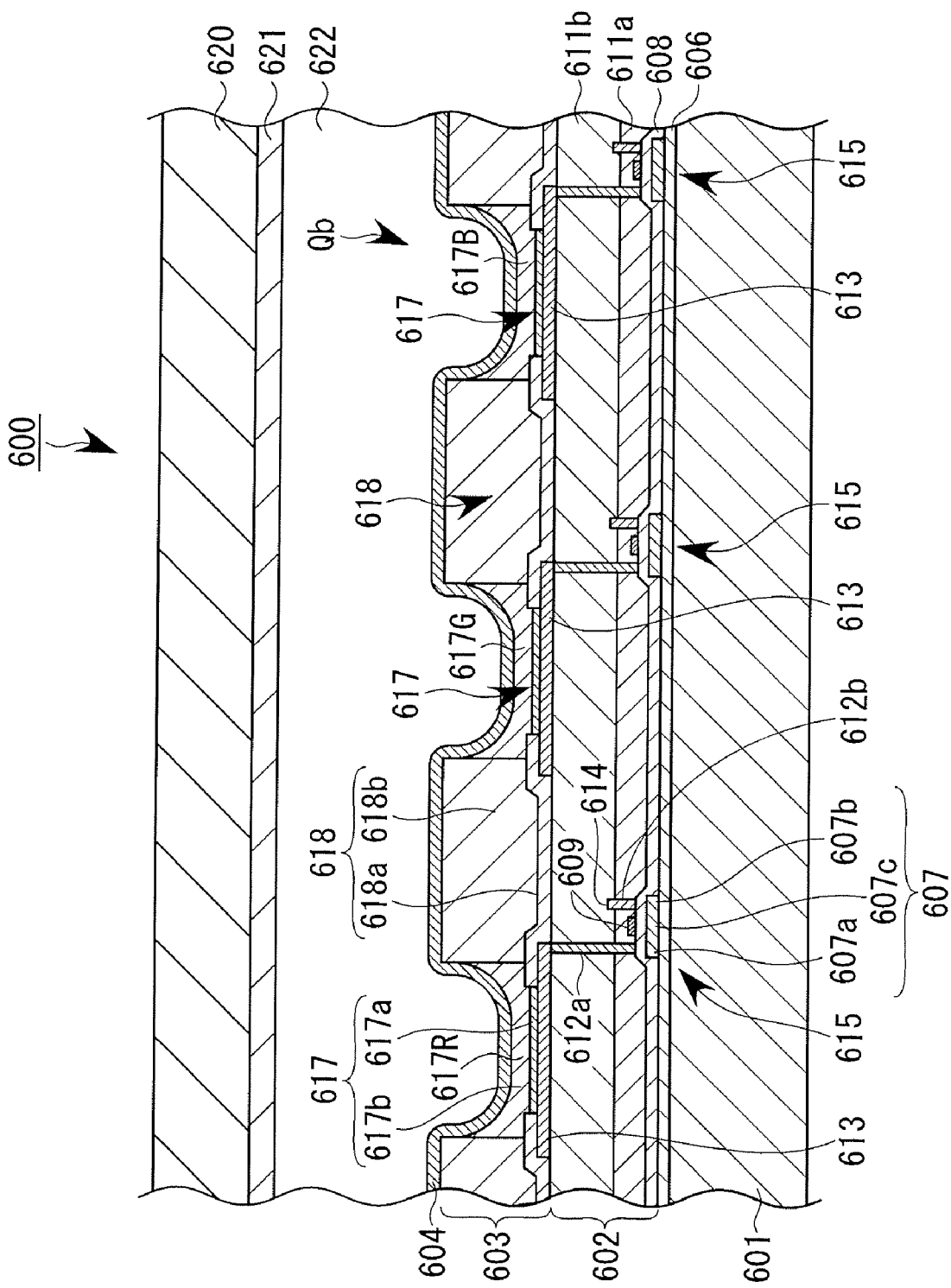
FIG. 11 is a schematic sectional view showing the relevant parts of the structure of the organic EL device in the third embodiment.

FIG. 11 is a schematic sectional view showing the relevant parts of the structure of the organic EL device. As shown in FIG. 11, the organic EL device 600 as the electro-optical device of the present embodiment is provided with an element substrate 601 that has a luminescent element part 603; and a sealing substrate 620 that is sealed to the element substrate 601 via a space 622. The element substrate 601 is also provided with a circuit element part 602 on the element substrate 601, and the luminescent element part 603 is formed over the circuit element part 602 and driven by the circuit element part 602. Three colors of luminescent layers 617R, 617G, 617B are formed in film-formation regions Qb in the luminescent element part 603. In the element substrate 601, three color elements that correspond to three colors of color layers 617R, 617G, 617B form a single set of picture elements, and the picture elements are arranged in a matrix on the circuit element part 602 of the element substrate 601. In the organic EL device 600 if the present embodiment, the light emitted from the luminescent element part 603 is emitted toward the element substrate 601.

The sealing substrate 620 is composed of glass or metal, and is bonded to the element substrate 601 via a sealing resin. A getter agent 621 is affixed to the sealed inside surface. The getter agent 621 absorbs water or oxygen that enters the space 622 between the element substrate 601 and the sealing substrate 620, and prevents the luminescent element part 603 from being degraded by the contaminating water or oxygen. The getter agent 621 may also be omitted.

The element substrate 601 has a plurality of film-formation regions Qb on the circuit element part 602, and is provided with banks 618 as partition wall parts for partitioning the plurality of film-formation regions Qb; electrodes 613 formed in the plurality of film-formation regions Qb; and positive hole implantation/transport layers 617a that are layered on the electrodes 613. The luminescent element part 603 as a color element is also provided that has luminescent layers 617R, 617G, 617B formed by applying the three types of the liquid material that include a luminescent-layer-forming material in the plurality of film-formation regions Qb. The banks 618 are composed of lower-layer banks 618a, and upper-layer banks 618b that essentially partition the film-formation regions Qb, wherein the lower-layer banks 618a are provided so as to protrude into the film-formation regions Qb, and the electrodes 613 and the luminescent layers 617R, 617G, 617B are formed by $SiO_2$ or another inorganic insulation material so as to prevent direct contact and electrical short circuiting with each other.

The element substrate 601 is composed of glass or another transparent substrate, for example, a base protective film 606 composed of a silicon oxide film is formed on the element substrate 601, and islands of semiconductor films 607 composed of polycrystalline silicon are formed on the base protective film 606. A source region 607a and a drain region 607b are formed by high-concentration P ion implantation in the semiconductor films 607. The portion into which P is not implanted is the channel region 607c. A transparent gate insulation film 608 for covering the base protective film 606 and the semiconductor films 607 is also formed, gate electrodes 609 composed of Al, Mo, Ta, Ti, W, or the like are formed on the gate insulation film 608, and a transparent first interlayer insulation film 611a and second interlayer insulation film 611b are formed on the gate electrodes 609 and the gate insulation film 608. The gate electrodes 609 are provided in positions that correspond to the channel regions 607c of the semiconductor films 607. Contact holes 612a, 612b that are connected to the source regions 607a and the drain regions 607b, respectively, of the semiconductor films 607 are also formed so as to penetrate through the first interlayer insulation film 611a and the second interlayer insulation film 611b. Transparent electrodes 613 composed of ITO (Indium Tin Oxide) are patterned in a predetermined shape and arranged (electrode formation step) on the second interlayer insulation film 611b, and the contact holes 612a are connected to the electrodes 613. The other contact holes 612b are connected to power supply lines 614. Thin film transistors 615 for driving that are connected to the electrodes 613 are formed in the circuit element part 602 in this manner. Retention capacitors and thin film transistors for switching are also formed in the circuit element part 602, but these components are not shown in FIG. 11.

The luminescent element part 603 is provided with the electrodes 613 as positive electrodes, the positive hole implantation/transport layers 617a and the luminescent layers 617R, 617G, 617B (referred to generically as luminescent layers 617b) that are layered in sequence on the electrodes 613, and the negative electrode 604 that is layered so as to cover the upper-layer banks 618b and the luminescent layers 617b. Using a transparent material to form the negative electrode 604, the sealing substrate 620, and the getter agent 621 enables the light generated from the direction of the sealing substrate 620 to be emitted.

The organic EL display device 600 has scanning lines (not shown) connected to the gate electrodes 609, and signal lines (not shown) connected to the source regions 607a, and when the thin film transistors (not shown) for switching are turned on by the scanning signal transmitted to the scanning lines, the potential of the signal lines at that time is maintained by the retention capacitors, and the on/off state of the thin film transistors 615 for driving is determined according to the state of the retention capacitors. Electric current flows from the power supply lines 614 to the electrodes 613 via the channel regions 607*c* of the thin film transistors 615 for driving, and the electric current then flows to the negative electrode 604 via the positive hole implantation/transport layers 617*a* and the luminescent layers 617*b*. The luminescent layers 617*b* emit light according to the amount of flowing current. The organic EL display device 600 can display the desired characters or image through the light emission mechanism of the luminescent element part 603 thus configured.

The luminescent layers 617R, 617G, 617B of the present embodiment are formed in a triangular shape as shown in FIG. 12, pairs of adjacent luminescent layers 617 of the same color are arranged so that the tips and bottom edges of the triangles thereof alternate, and rows of each color are formed. The regions in which the luminescent layers 617R, 617B, 617B are formed each correspond to film-formation regions Qb. Adopting such a formation makes it possible to increase resolution or eliminate wasted space in the pixel arrangement.

Organic EL Device Manufacturing Method

The method for manufacturing an organic EL device of the present embodiment will next be described based on FIGS. 13 and 14. FIG. 13 is a flowchart showing the method for manufacturing an organic EL device, and FIG. 14 is a schematic sectional view showing the method for manufacturing an organic EL device. The circuit element part 602 formed on the element substrate 601 is not shown in FIGS. 14A through 14F.

As shown in FIG. 13, the method for manufacturing an organic EL device is provided with a step of forming the electrodes 613 in positions that correspond to the plurality of film-formation regions Qb of the element substrate 601, and a bank (partition wall part) formation step of forming the upper-layer banks 618*b* on the lower-layer banks 618*a* so as to essentially partition the film-formation regions Qb. The manufacturing method is also provided with a step of treating the surfaces of the film-formation regions Qb that are partitioned by the upper-layer banks 618*b*, a step of applying the liquid material that includes a positive hole implantation/transport layer forming material in the surface-treated film-formation regions Qb to draw the positive hole implantation/transport layers 617*a* by discharging, and a step of drying the discharged liquid material to form the positive hole implantation/transport layers 617*a*. The manufacturing method is also provided with a step of treating the surfaces of the film-formation regions Qb in which the positive hole implantation/transport layers 617*a* are formed, a luminescent layer drawing step as a color element drawing step of applying three types of the liquid material that includes the luminescent layer forming material as a color element forming material in the surface-treated film-formation regions Qb and drawing the luminescent layers 617*b*, and a step of drying the discharged three types of the liquid material to form the luminescent layers 617*b*. The manufacturing method is furthermore provided with a step of forming the negative electrode 604 so as to cover the upper-layer banks 618*b* and the luminescent layers 617*b*. The three types of the liquid material are applied to the film-formation regions Qb using the liquid material discharge device 10.

Step S21 in FIG. 13 is an electrode (positive electrode) formation step. In step S21, the electrodes 613 are formed in positions that correspond to the film-formation regions Qb of the element substrate 601 on which the circuit element part 602 is already formed, as shown in FIG. 14A. In an example of the formation method, a transparent electrode film is formed on the surface of the element substrate 601 by sputtering or vapor deposition in a vacuum using ITO or another transparent electrode material. A photolithography method is then used to leave only the necessary portion, and the electrodes 613 may be formed by etching. The element substrate 601 is covered in advance by a photoresist, and exposure/development are performed so as to open the regions for forming the electrodes 613. A transparent electrode film of ITO or the like may then be formed in the open parts, and the remaining photoresist may be removed. The process then proceeds to step S22.

Step S22 in FIG. 13 is a bank (partition wall part) formation step. In step S22, the lower-layer banks 618*a* are formed so as to cover portions of the plurality of electrodes 613 of the element substrate 601, as shown in FIG. 14B. The material used to form the lower-layer banks 618*a* is $SiO_2$ (silicon dioxide), which is an inorganic material having insulation properties. In an example of the method for forming the lower-layer banks 618*a*, the surfaces of the electrodes 613 are masked using a resist or the like so as to correspond to the subsequently formed luminescent layers 617*b*. The masked element substrate 601 is then placed in a vacuum device, and the lower-layer banks 618*a* are formed by sputtering or vacuum deposition using $SiO_2$ as the target or source material. The resist or other mask is subsequently peeled off. Since the lower-layer banks 618*a* are formed by $SiO_2$, adequate transparency is obtained when the film thickness thereof is 200 nm or less, and light emission is not inhibited even when the positive hole implantation/transport layers 617*a* and the luminescent layers 617*b* are subsequently layered.

The upper-layer banks 618*b* are then formed on the lower-layer banks 618*a* so as to essentially partition the film-formation regions Qb. The material used to form the upper-layer banks 618*b* is preferably a material that is durable with respect to the solvent of the three types of liquid material 84R, 84G, 84B that include the luminescent layer forming material described hereinafter, and a material that can be compounded with tetrafluoroethylene through the use of a plasma treatment using a fluorine-based gas as the treatment gas is preferred, e.g., an organic material such as an acrylic resin, an epoxy resin, a photosensitive polyimide, or the like. In an example of the method for forming the upper-layer banks 618*b*, the abovementioned photosensitive organic material is applied by roll coating or spin coating to the surface of the element substrate 601 on which the lower-layer banks 618*a* are formed, and the coating is dried to form a photosensitive resin layer having a thickness of about 2 μm. A mask provided with open parts whose size corresponds to the film-formation regions Qb is then placed against the element substrate 601 in a predetermined position, and exposure/development is performed, whereby the upper-layer banks 618*b* are formed. The banks 618 as partition wall parts having lower-layer banks 618*a* and upper-layer banks 618*b* are thereby formed. The process then proceeds to step S23.

Step S23 in FIG. 13 is a step of treating the surfaces of the film-formation regions Qb. In step S23, the surface of the element substrate 601 on which the banks 618 are formed is first plasma treated using $O_2$ gas as the treatment gas. The surfaces of the electrodes 613, the protruding parts of the lower-layer banks 618*a*, and the surfaces (including the wall surfaces) of the upper-layer banks 618*b* are thereby activated and lyophilized. Plasma treatment is then performed using CF$_4$ or another fluorine-based gas as the treatment gas. The fluorine-based gas is thereby reacted with only the surfaces of the upper-layer banks 618b that are composed of the photosensitive resin as an organic material, and the surfaces are rendered fluid repellent. The process then proceeds to step S24.

Step S24 in FIG. 13 is a positive hole implantation/transport layer formation step. In step S24, a liquid material 82 that includes a positive hole implantation/transport layer forming material is applied in the film-formation regions Qb, as shown in FIG. 14C. The method for applying the liquid material 82 uses the liquid material discharge device 10. The liquid material 82 discharged from the droplet discharge heads 50 lands as droplets on the electrodes 613 of the element substrate 601. The method for applying this liquid material will be described hereinafter. The process then proceeds to step S25.

Step S25 in FIG. 13 is a drying/film-formation step. In step S25, the solvent component of the liquid material 82 is dried and removed by heating the element substrate 601 by a lamp annealing method or other method, for example, and the positive hole implantation/transport layers 617a are formed in the regions partitioned by the lower-layer banks 618a of the electrodes 613. In the present embodiment, PEDOT (polyethylene dioxy thiophene) is used as the positive hole implantation/transport layer forming material. Positive hole implantation/transport layers 617a composed of the same material are formed in the film-formation regions Qb in this case, but the material for forming the positive hole implantation/transport layers 617a may also be varied for each film-formation region Qb according to the material used to form subsequent luminescent layers. The process then proceeds to step S26.

Step S26 in FIG. 13 is a step of treating the surface of the element substrate 601 on which the positive hole implantation/transport layers 617a are formed. In step S26, when the positive hole implantation/transport layers 617a are formed using the abovementioned positive hole implantation/transport layer forming material, since the surfaces thereof repel the three types of liquid material 84R, 84G, 84B used in the next step S27, a surface treatment is again performed so that at least the areas within the film-formation regions Qb are lyophilic. The surfaces are treated by a method in which the solvent used in the three types of liquid material 84R, 84G, 84B is applied and dried. A spraying method, a spin coating method, or other method may be used to apply the solvent. The process then proceeds to step S27.

Step S27 in FIG. 13 is an RGB luminescent layer drawing step. In step S27, the liquid material discharge device 10 is used to apply the three types of liquid material 84R, 84G, 84B including the luminescent layer forming material from different droplet discharge heads 50 to the plurality of film-formation regions Qb, as shown in FIG. 14D. The liquid material 84R includes a material for forming the luminescent layers 617R (red), the liquid material 84G includes a material for forming the luminescent layers 617G (green), and the liquid material 84B includes a material for forming the luminescent layers 617B (blue). The liquid material 84R, 84G, 84B thus landed spreads out in the film-formation regions Qb and rise to form shapes that have an arcuate profile. The method for applying the liquid material is described hereinafter. The process then proceeds to step S28.

Step S28 in FIG. 13 is a drying/film-formation step. In step S28, the solvent component of the discharged and drawn liquid material 84R, 84G, 84B is dried and removed, and films are formed so that the luminescent layers 617R, 617G, 617B are layered on the positive hole implantation/transport layers 617a of the film-formation regions Qb, as shown in FIG. 14E. A vacuum drying method that enables the solvent to be evaporated at a substantially constant rate is preferred as the method for drying the element substrate 601 on which the liquid material 84R, 84G, 84B is discharged and drawn. The process then proceeds to step S29.

Step S29 in FIG. 13 is a negative electrode formation step. In step S29, the negative electrode 604 is formed so as to cover the surfaces of the upper-layer banks 618b and the luminescent layers 617R, 617G, 617B of the element substrate 601, as shown in FIG. 14F. A combination of Ca, Ba, Al, or another metal and LiF or another fluoride is preferably used as the material for forming the negative electrode 604. It is particularly preferred that a film of Ca, Ba, or LiF having a small work function be formed on the side towards the luminescent layers 617R, 617G, 617B, and that a film of Al or the like having a large work function be formed on the side facing away from the luminescent layers. A protective layer of SiO$_2$, SiN, or the like may also be layered on the negative electrode 604. The negative electrode 604 can thereby be prevented from oxidizing. Methods used to form the negative electrode 604 include vapor deposition, sputtering, CVD, and other methods. Vapor deposition is particularly preferred, since this method makes it possible to prevent the luminescent layers from being damaged by heat. The organic EL device 600 is manufactured using the element substrate 601 thus created.

Method for Applying Liquid Material

The method for applying the liquid material 82 that includes the positive hole implantation/transport layer forming material, and the method for applying the three types of liquid material 84R, 84G, 84B that includes the luminescent layer forming material will next be described.

The element substrate 601 as the substrate B is mounted on the stage 5 of the liquid material discharge device 10 shown in FIG. 1. The element substrate 601 is thereby positioned facing the droplet discharge heads 50 that are mounted in the head unit 9. In the present embodiment, one pair of film-formation regions Qb1, Qb2 is positioned opposite the nozzles 52 of one droplet discharge head 50, as shown in FIG. 15A.

Possible landing positions 90 in which the liquid material lands are set in the film-formation regions Qb1, Qb2. The possible landing positions 90 of the liquid material are determined by the nozzle interval in the secondary scanning direction (Y direction) and the discharge interval of the liquid material in the primary scanning direction (X direction). The nozzle interval in the secondary scanning direction (Y direction) is determined by the scanning direction and the pitch P of the nozzles formed in the droplet discharge heads 50. The discharge interval in the primary scanning direction (X direction) is determined by the speed at which the stage 5 is moved by the substrate movement mechanism 20 (primary scanning speed), the frequency of the discharge signal, and other factors. In the present embodiment, the nozzle interval in the secondary scanning direction is designated as the nozzle pitch P shown in FIG. 3, and the discharge interval in the primary scanning direction is designated as the pitch V determined by the movement speed of the stage 5 and the frequency of the discharge signal.

The film-formation regions Qb1, Qb2 in the present embodiment are formed in a triangular shape for example, and pairs of adjacent film-formation regions Qb1, Qb2 of the same color are arranged so that the tips and bottom edges of the triangles thereof alternate. The film-formation regions Qb1, Qb2 therefore have a maximum of k possible landing positions 90 parallel to the bottom edge of each triangle, and one possible landing position 90 near the tip of each triangle.

The number of possible landing positions 90 also increases by two with each movement in the primary scanning direction.

In this arrangement, when the liquid material is discharged into the film-formation regions Qb1, Qb2 from the corresponding nozzles 52 of the droplet discharge heads 50, the liquid material lands in the first row of possible landing positions 90 in the Y direction that are arranged in a matrix, as shown in FIG. 15B. At this time, the liquid material is applied to one possible landing position 90 in the film-formation region Qb1, and the liquid material is applied to k possible landing positions 90 in the film-formation region Qb2. Specifically, of the 180 nozzles 52 of the droplet discharge head 50, the liquid material is discharged from 1+k nozzles, and the nozzle duty is (1+k)/180.

The liquid material is then discharged from the nozzles 52 while the element substrate 601 mounted on the stage 5 is moved an amount commensurate with the pitch V in the X direction by the substrate movement mechanism 20 of the liquid material discharge device 10 shown in FIG. 1. This operation is repeated twice. As a result, the liquid material can be supplied to the second and third rows in the X direction in the film-formation region Qb1 and the film-formation region Qb2.

In the second row in the film-formation region Qb1, the liquid material is applied to three possible landing positions 90, and in the film-formation region Qb2, the liquid material is applied to k−2 possible landing positions 90. Specifically, of the 180 nozzles 52 of the droplet discharge head 50, the liquid material is discharged from 3+(k−2) nozzles, and the nozzle duty is (1+k)/180. In the third row in the film-formation region Qb1, the liquid material is applied to five possible landing positions 90, and in the film-formation region Qb2, the liquid material is applied to k−4 possible landing positions 90. Specifically, of the 180 nozzles 52 of the droplet discharge head 50, the liquid material is discharged from 5+(k−4) nozzles, and the nozzle duty is (1+k)180.

The liquid material is thus discharged into the film-formation regions Qb1, Qb2 from the nozzles 52 for each row while the element substrate 601 is moved an amount commensurate with the pitch V in the X direction, as shown in FIG. 15D. In this case, of the 180 nozzles 52 of the droplet discharge head 50, the liquid material is discharged from 1+k nozzles 52, and the nozzle duty is (1+k)180 for each row, the same as described above.

The effects of the third embodiment will next be described.

(1) In the organic EL device 600, the total number of possible landing positions 90 in the direction of the nozzle rows 52a of the droplet discharge head can be set to always be 1+k in the film-formation regions Qb1, Qb2. Specifically, the nozzle duty is always stable at (1+k)180, and it is possible to minimize fluctuation of the discharge quantity due to variation in the nozzle duty. The occurrence of stripes of uneven shading in the luminescent layers 617R, 617G, 617B and the positive hole implantation/transport layers 617a can thus be reduced, and the image quality of the organic EL device 600 as an electro-optical device can be enhanced.

Fourth Embodiment

An electronic instrument in which the liquid crystal display device of the first or second embodiment, or the organic EL device of the third embodiment is mounted will next be described. FIG. 16 is a schematic perspective view showing a mobile information processing device as the electronic instrument.

As shown in FIG. 16, the mobile information processing device 700 as the electronic instrument of the present embodiment is provided with a display unit 703 and an information processing device main body 701 that has a keyboard 702 for input. The liquid crystal display device 500 or the organic EL device 600 is mounted in the display unit 703.

The effects of the fourth embodiment are described below.

(1) The mobile information processing device 700 of the present embodiment is equipped with the liquid crystal display device of the first or second embodiment, or the organic EL device of the third embodiment. A mobile information processing device 700 can therefore be provided as an electronic instrument in which there is minimal occurrence of stripes of uneven shading or other display defects, and characters, images, and other information can be identified with a high degree of display quality.

Embodiments of the present invention have been described above, but the present invention may be modified with respect to the embodiments described above within the scope of the present invention in various ways. An example of a modification other than the abovementioned embodiments is described below.

(Modification 1) The shape of the film-formation regions Q is not limited by the embodiments described above, and various other shapes are possible. For example, as shown in FIG. 17 showing this modification, two adjacent rectangular pixels may be shaped so that one pixel has convex parts at the abutting short edges thereof, and the other pixel has concave parts at the abutting short edges thereof, and the pixels complement the surface area of each other. Specifically, at least two or more film-formation regions Q include a portion in which the total number of possible landing positions 90 that face the plurality of nozzles 52 at the same time is the same in the primary scanning direction.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An electro-optical device comprising:
a substrate having a plurality of film-formation regions configured and arranged to receive a liquid material discharged from a plurality of nozzles of a nozzle row while the substrate and the nozzle row are moved relative to each other in a primary scanning direction,
each of the film-formation regions including a plurality of landing positions in which the liquid material lands with the landing positions being set by a nozzle interval in a direction of the nozzle row and a discharge interval in the primary scanning direction,
at least two or more of the film-formation regions including a portion in which a total number of the landing positions in the at least two or more of the film-formation regions that simultaneously face the nozzles is the same in the primary scanning direction,
the film-formation regions including a first region and a second region having a different shape or a different arrangement of the landing positions from the first region.

2. The electro-optical device according to claim 1, wherein at least one of the film-formation regions includes a portion in which a number of the landing positions that simultaneously face the nozzles changes in the primary scanning direction.

3. The electro-optical device according to claim 1, wherein the first and second regions include a portion in which a number of the landing positions in the first region that simultaneously face the nozzles is different from a number of the landing positions in the second region that simultaneously face the nozzles.

4. The electro-optical device according to claim 3, wherein a number of the landing positions in the first region and a number of the landing positions in the second region are set to be equal to each other.

5. An electronic instrument comprising the electro-optical device according to claim 1.

6. An electro-optical device comprising:
a substrate having a plurality of film-formation regions configured and arranged to receive a liquid material discharged from a plurality of nozzles of a nozzle row while the substrate and the nozzle row are moved relative to each other in a primary scanning direction,
each of the film-formation regions including a plurality of landing positions in which the liquid material lands with the landing positions being set by a nozzle interval in a direction of the nozzle row and a discharge interval in the primary scanning direction,
a total number of the landing positions that simultaneously face the nozzles being the same in the primary scanning direction in at least two or more of the film-formation regions that face the nozzle row,
the film-formation regions including a first region and a second region having a different shape or a different arrangement of the landing positions from the first region.

7. The electro-optical device according to claim 6, wherein at least one of the film-formation regions includes a portion in which a number of the landing positions that simultaneously face the nozzles changes in the primary scanning direction.

8. The electro-optical device according to claim 6, wherein the first and second regions include a portion in which a number of the landing positions in the first region that simultaneously face the nozzles is different from a number of the landing positions in the second region that simultaneously face the nozzles.

9. The electro-optical device according to claim 8, wherein a number of the landing positions in the first region and a number of the landing positions in the second region are set to be equal to each other.

10. An electronic instrument comprising the electro-optical device according to claim 6.

* * * * *